US009063877B2

(12) United States Patent
Nakase

(10) Patent No.: US 9,063,877 B2
(45) Date of Patent: Jun. 23, 2015

(54) STORAGE SYSTEM, STORAGE CONTROLLER, AND METHOD FOR MANAGING MAPPING BETWEEN LOCAL ADDRESS AND PHYSICAL ADDRESS

(71) Applicants: KABUSHIKI KAISHA TOSHIBA, Minato-ku (JP); TOSHIBA SOLUTIONS CORPORATION, Tokyo (JP)

(72) Inventor: Shiro Nakase, Ome (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 175 days.

(21) Appl. No.: 13/955,999

(22) Filed: Jul. 31, 2013

(65) Prior Publication Data

US 2014/0297964 A1    Oct. 2, 2014

Related U.S. Application Data

(63) Continuation of application No. PCT/JP2013/059527, filed on Mar. 29, 2013.

(51) Int. Cl.
*G06F 12/00* (2006.01)
*G06F 12/10* (2006.01)
*G06F 12/12* (2006.01)

(52) U.S. Cl.
CPC .......... *G06F 12/1054* (2013.01); *G06F 12/122* (2013.01); *G06F 12/1009* (2013.01)

(58) Field of Classification Search
CPC .... G06F 12/1054; G06F 12/10; G06F 12/122

USPC .................................................. 711/136, 202
See application file for complete search history.

(56) References Cited

U.S. PATENT DOCUMENTS 5,396,619 A * 3/1995 Walton .......................... 714/6.13
6,480,948 B1 * 11/2002 Virajpet et al. ................ 711/202

(Continued)

FOREIGN PATENT DOCUMENTS

| CN | 102667704 | | 9/2012 |
| EP | 1657630 | A1 | 5/2006 |
| EP | 2 178 005 | A2 | 4/2010 |
| GB | 2489343 | A | 9/2012 |

(Continued)

OTHER PUBLICATIONS

International Search Report dated May 28, 2013, issued in International Application No. PCT/JP2013/059527 (2 pages).

*Primary Examiner* — Aracelis Ruiz
(74) *Attorney, Agent, or Firm* — Finnegan, Henderson, Farabow, Garrett & Dunner, LLP

(57) ABSTRACT

According to one embodiment, a mapping manager of a storage controller changes a first chunk from a second state to a third state if an access condition to the first chunk is a first condition that needs high speed access and the first chunk is in the second state. The second state is a state in which a first logical address of the first chunk is mapped to a first physical address in a second storage device slower and having a larger capacity than a first storage device. In the third state, the first logical address is mapped to a second physical address in the first storage device and also mapped to the first physical address in the second storage device.

20 Claims, 13 Drawing Sheets

(56) References Cited

U.S. PATENT DOCUMENTS

| | | |
|---|---|---|
| 2006/0107016 A1 | 5/2006 | Murotani et al. |
| 2007/0277011 A1 | 11/2007 | Tanaka et al. |
| 2008/0288723 A1 | 11/2008 | Murotani et al. |
| 2010/0095164 A1 | 4/2010 | Kamei et al. |
| 2011/0040937 A1* | 2/2011 | Augenstein et al. .......... 711/117 |
| 2011/0153931 A1 | 6/2011 | Bell, Jr. et al. |
| 2011/0231631 A1 | 9/2011 | Matsuzawa et al. |

FOREIGN PATENT DOCUMENTS

| | | |
|---|---|---|
| JP | 2006-139552 | 6/2006 |
| JP | 2007-004710 | 1/2007 |
| JP | 2007-316995 | 12/2007 |
| JP | 2010-097359 | 4/2010 |
| JP | 2011-192259 | 9/2011 |
| WO | WO 2011/076565 A1 | 6/2011 |

* cited by examiner

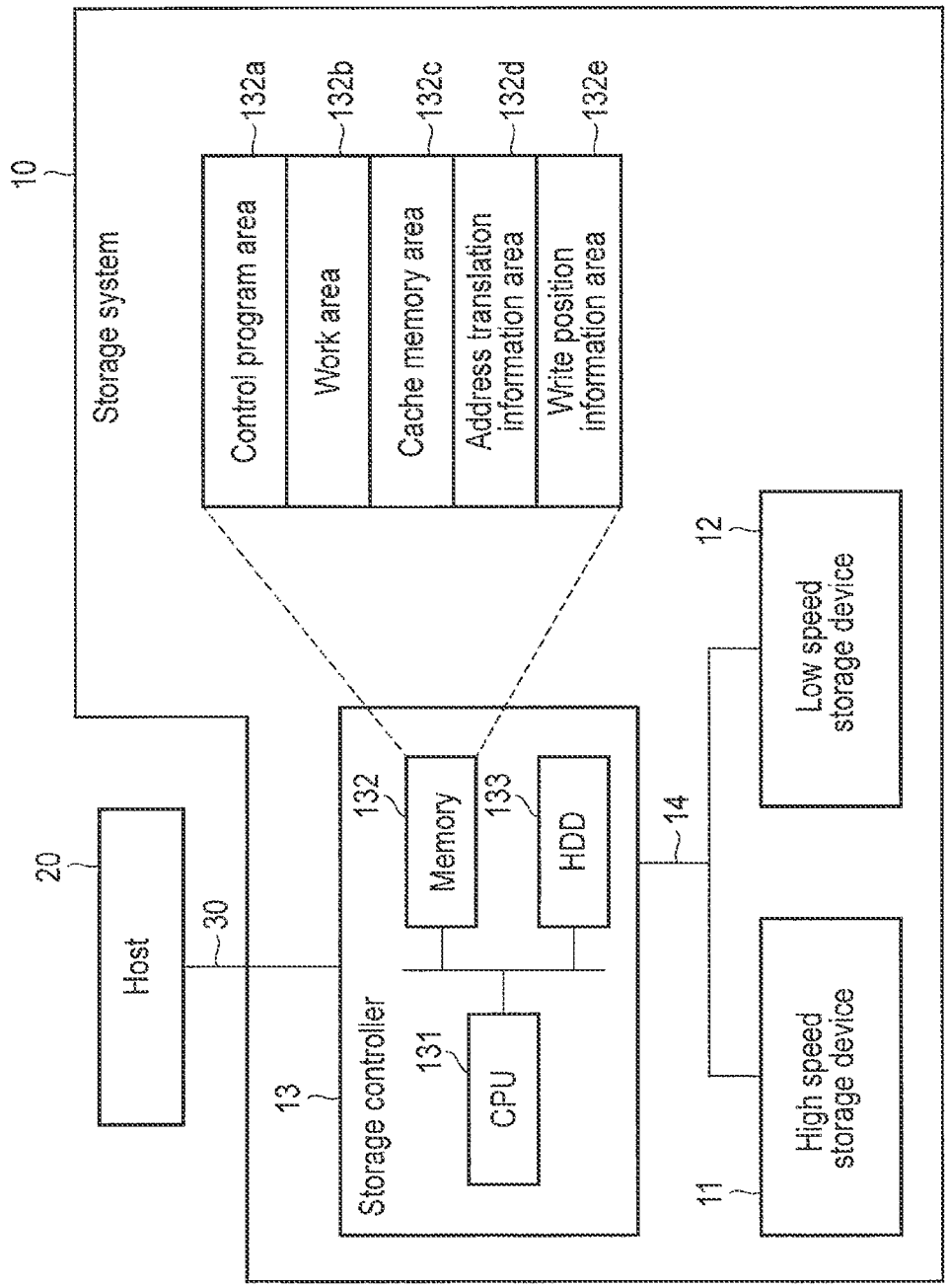
F I G. 1

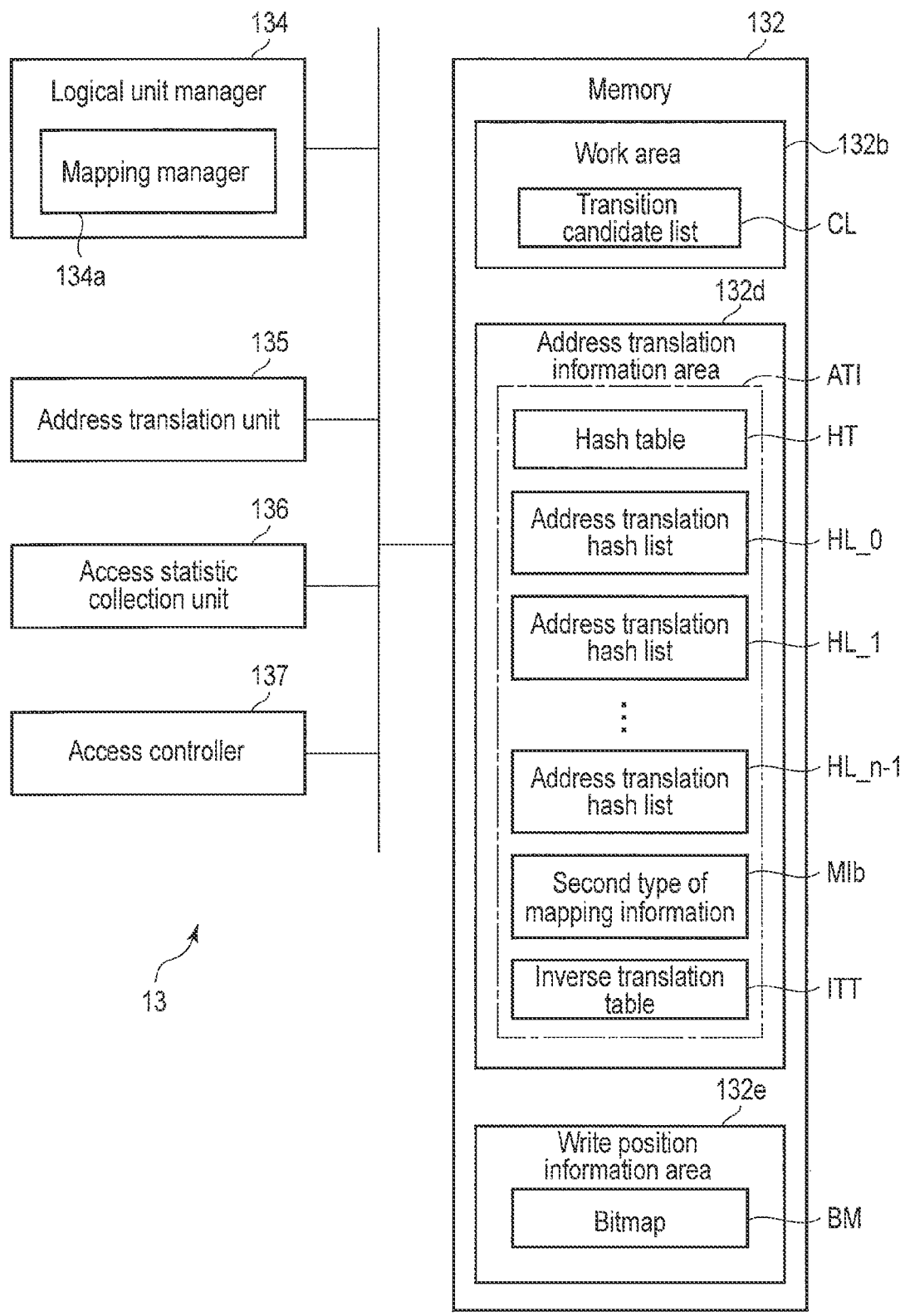
F I G. 2

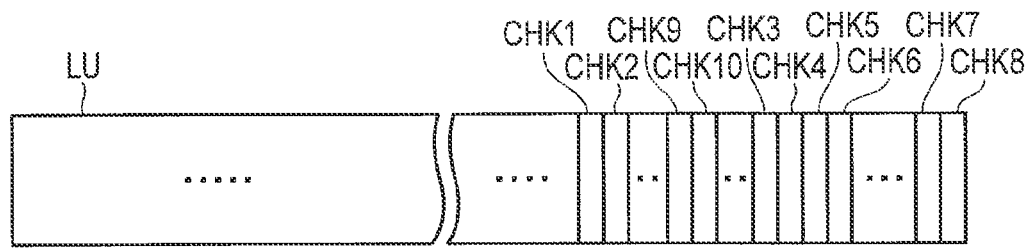
F I G. 3
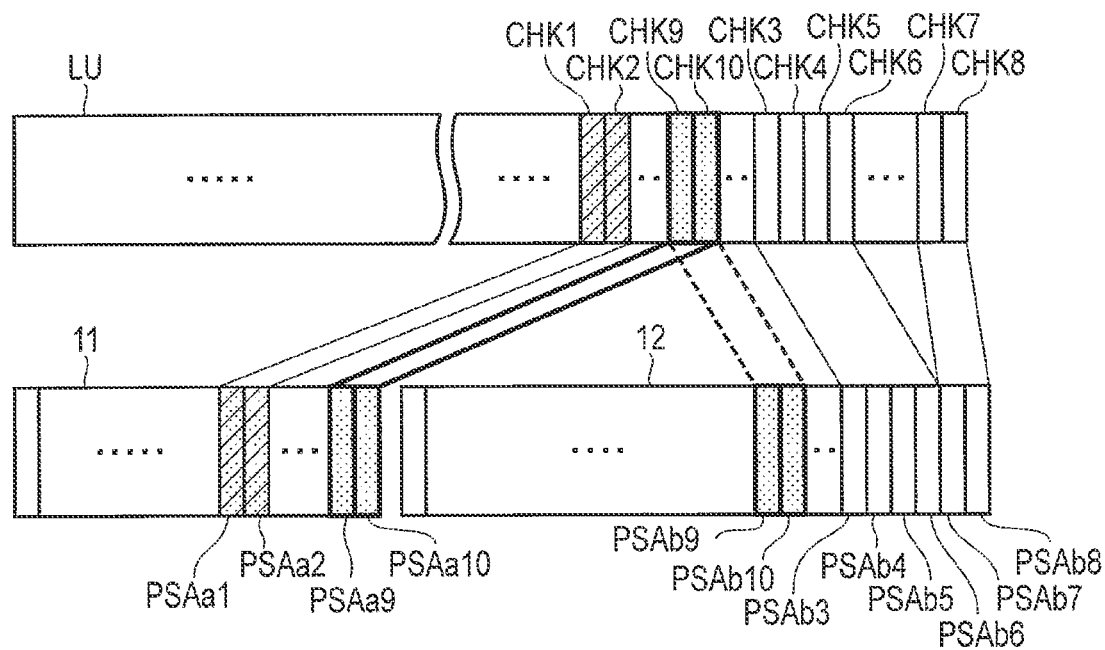
F I G. 4

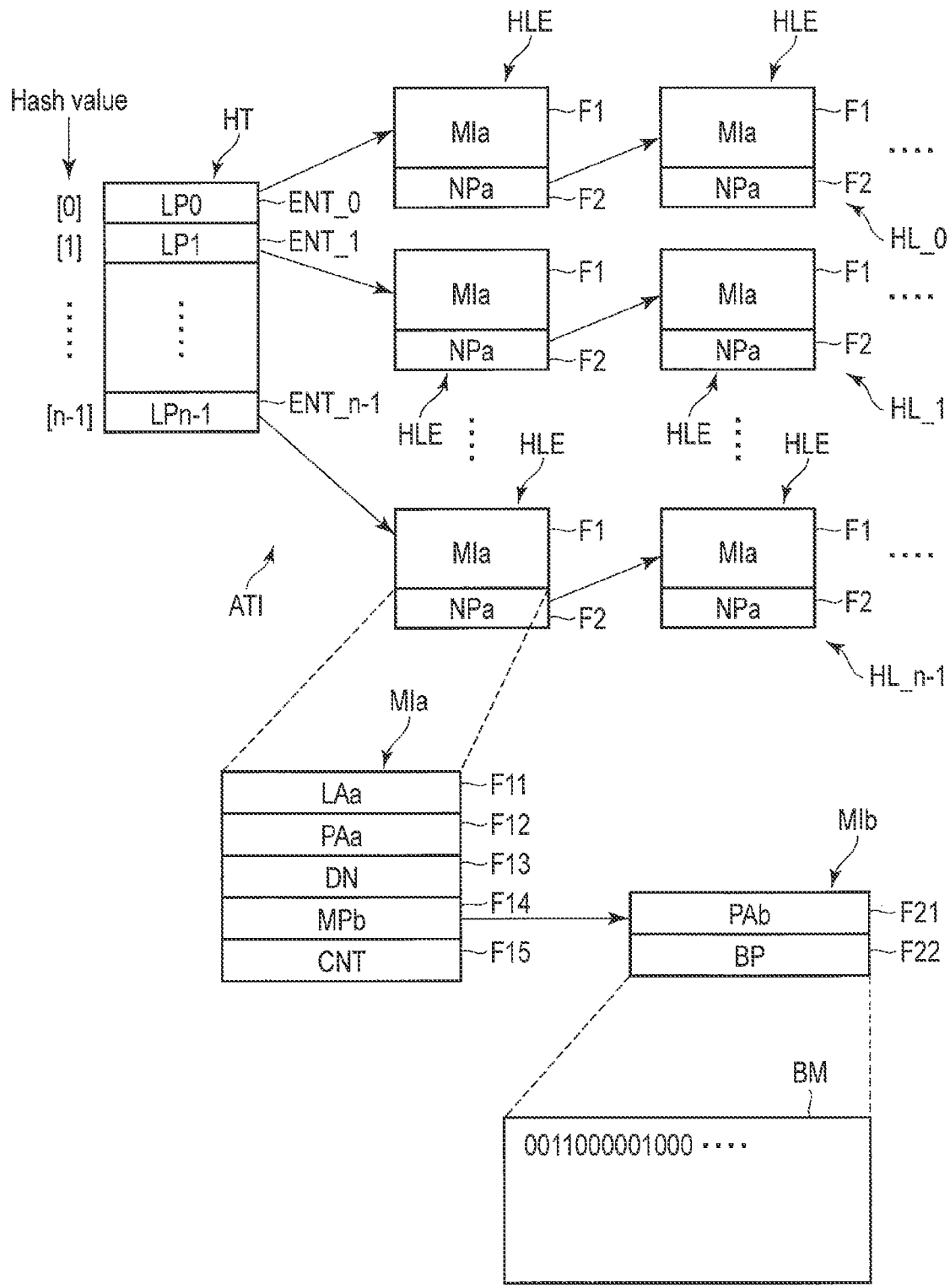
F I G. 6

| Physical address | Logical address |
|---|---|
| 0 | LAA |
| 1 | LAB |
| 2 | −1 |
| ⋮ | ⋮ |
| N−1 | LAZ |

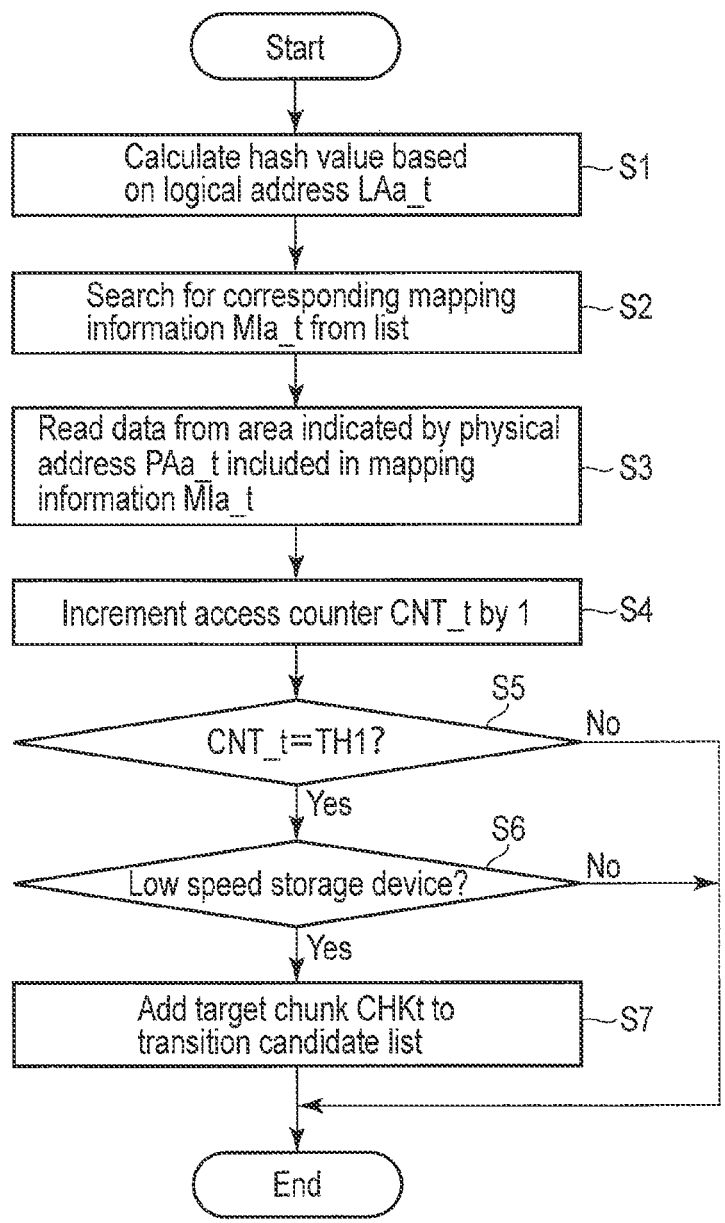
F I G. 9

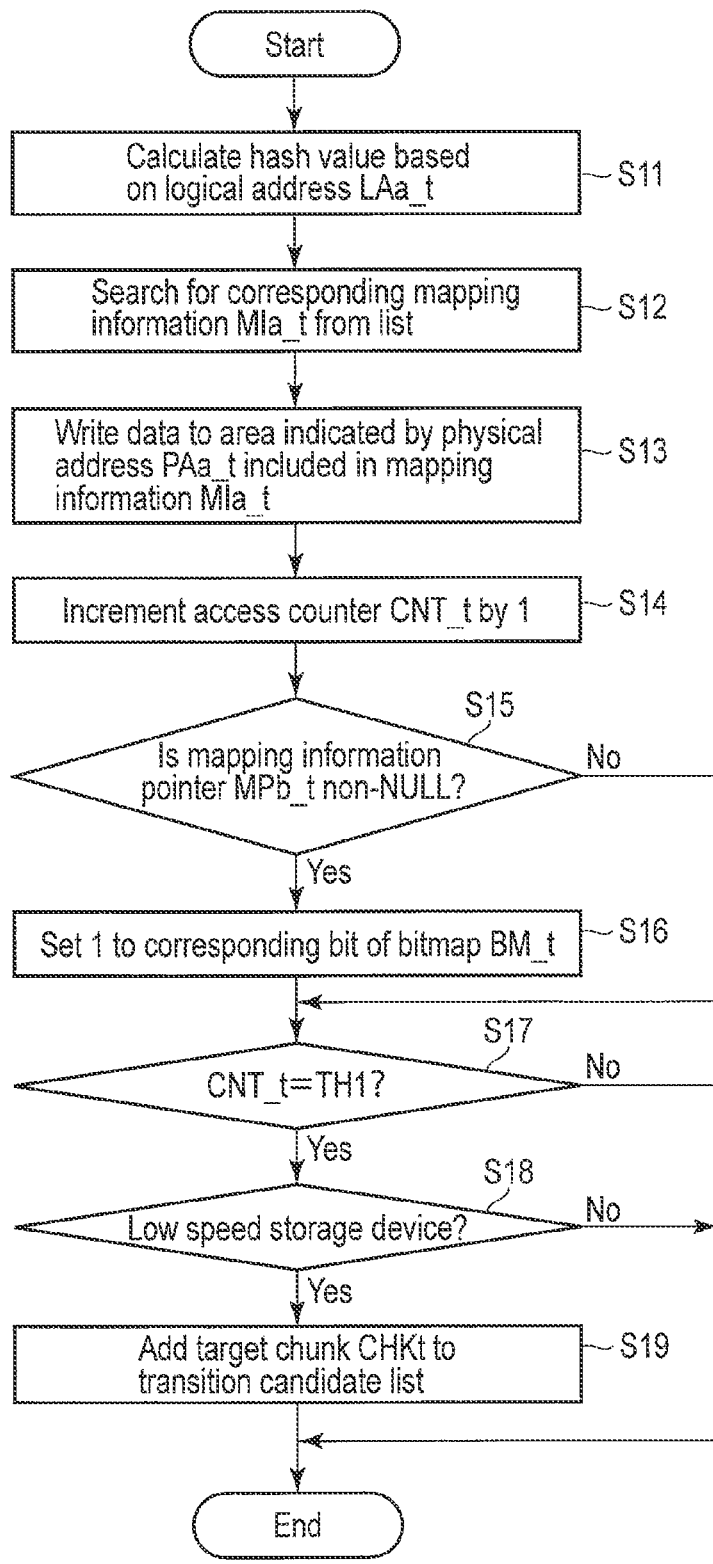
F I G. 10

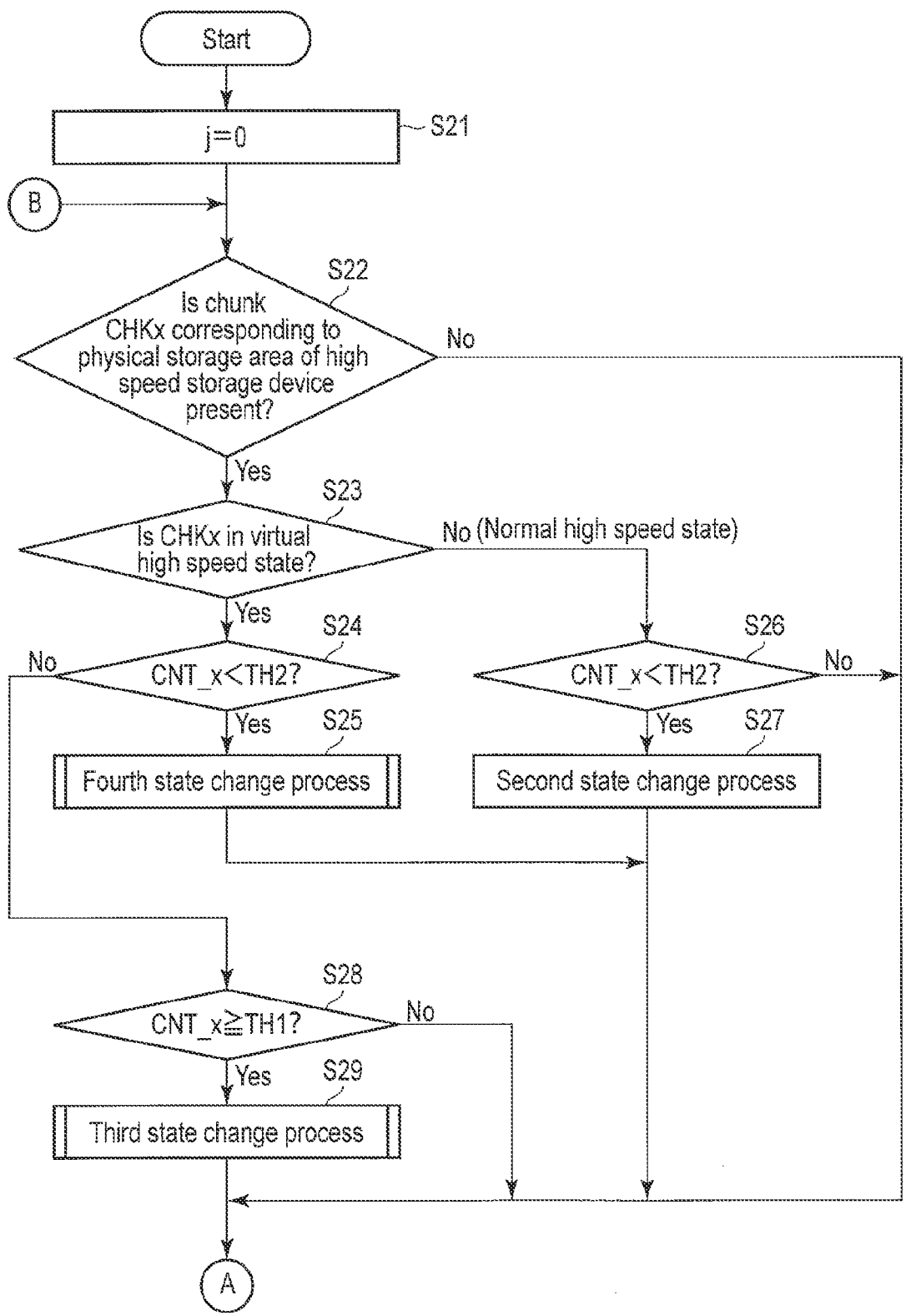
F I G. 11

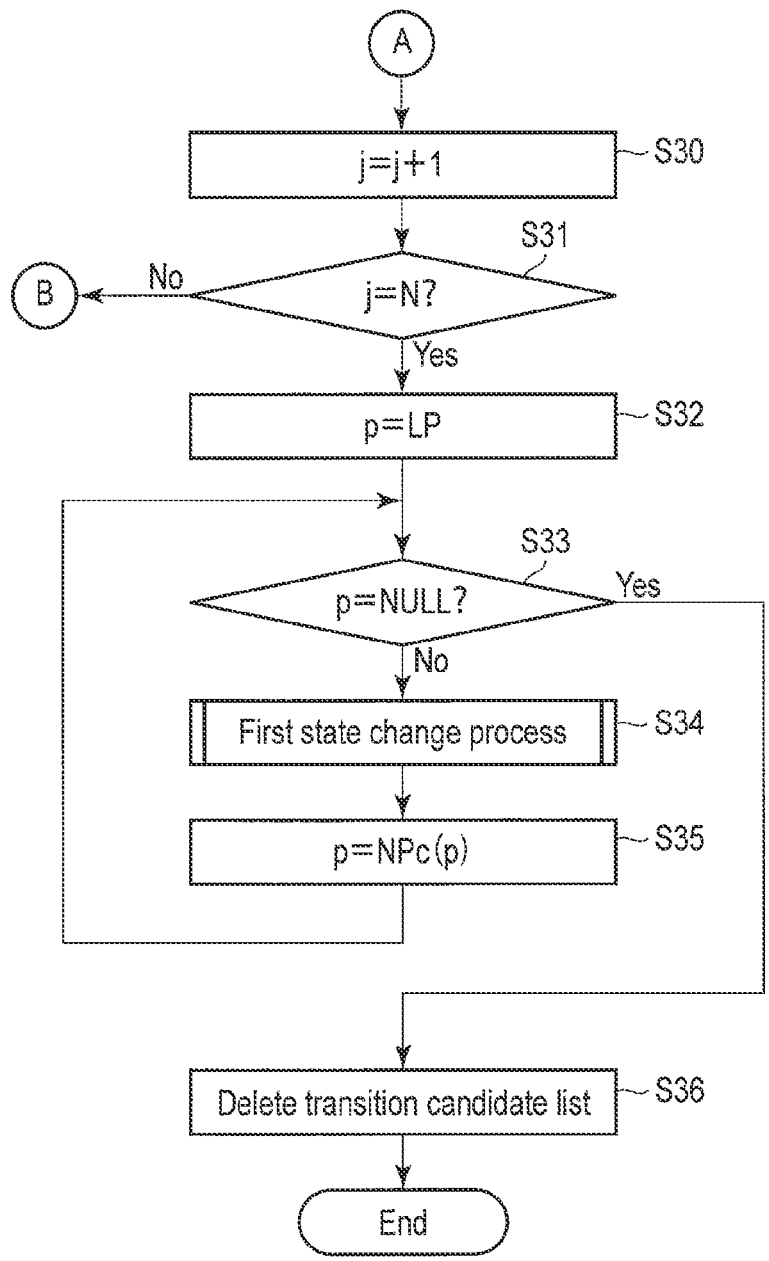
F I G. 12

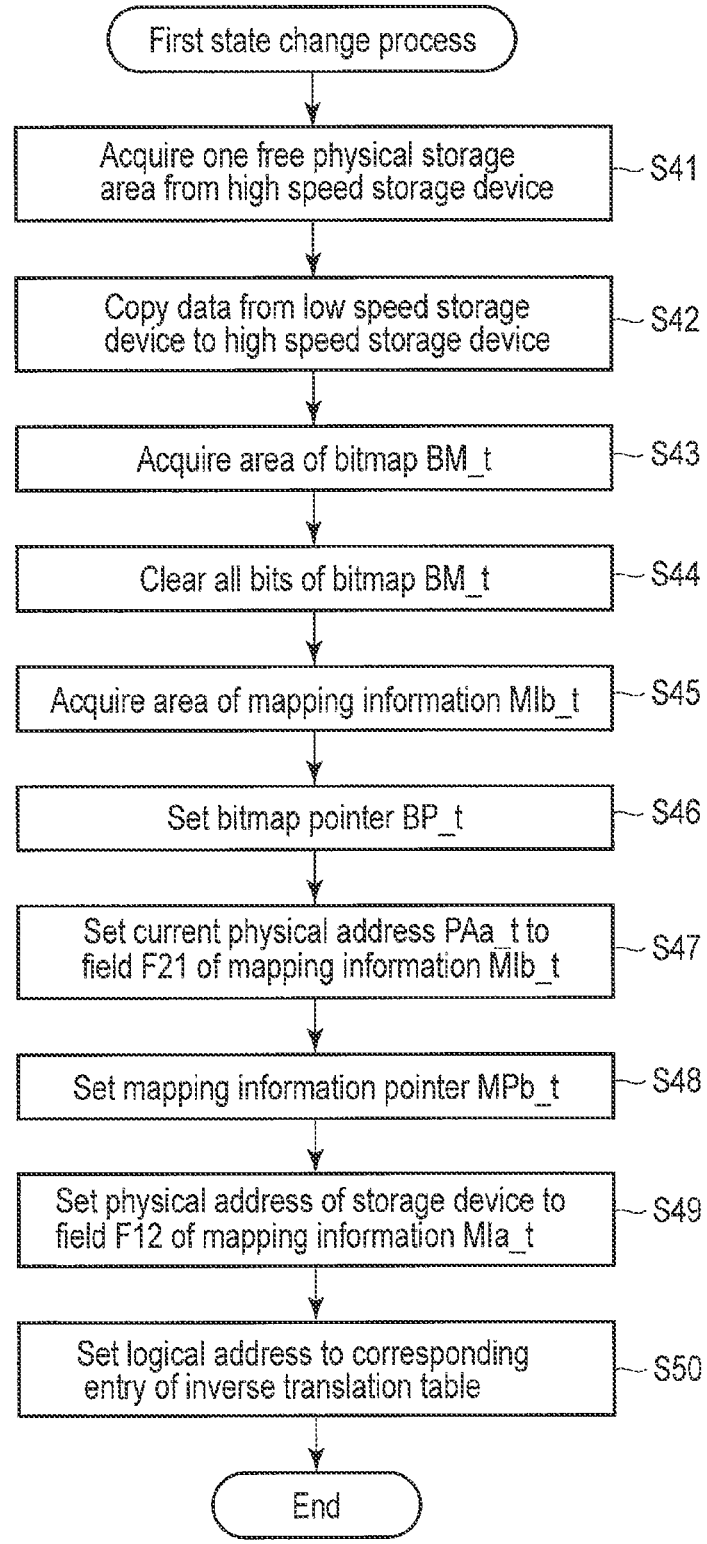
F I G. 13

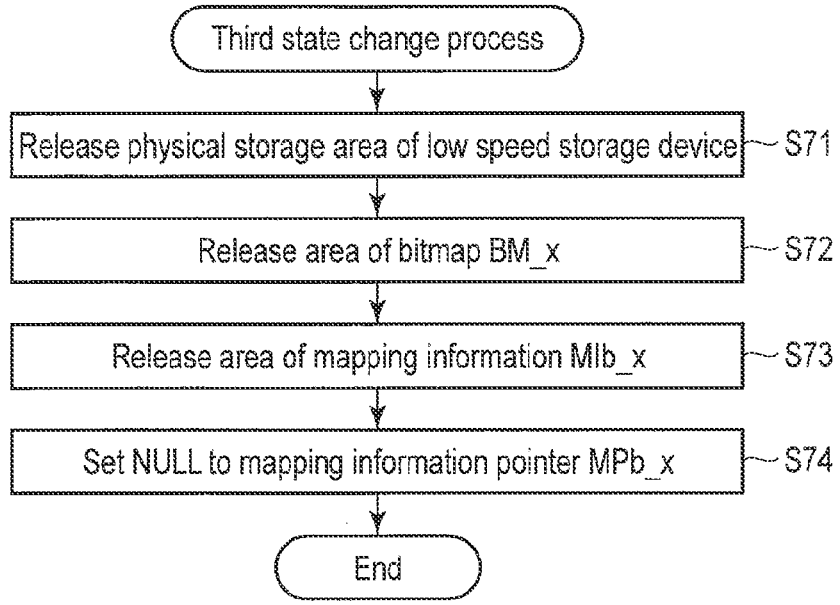
F I G. 15
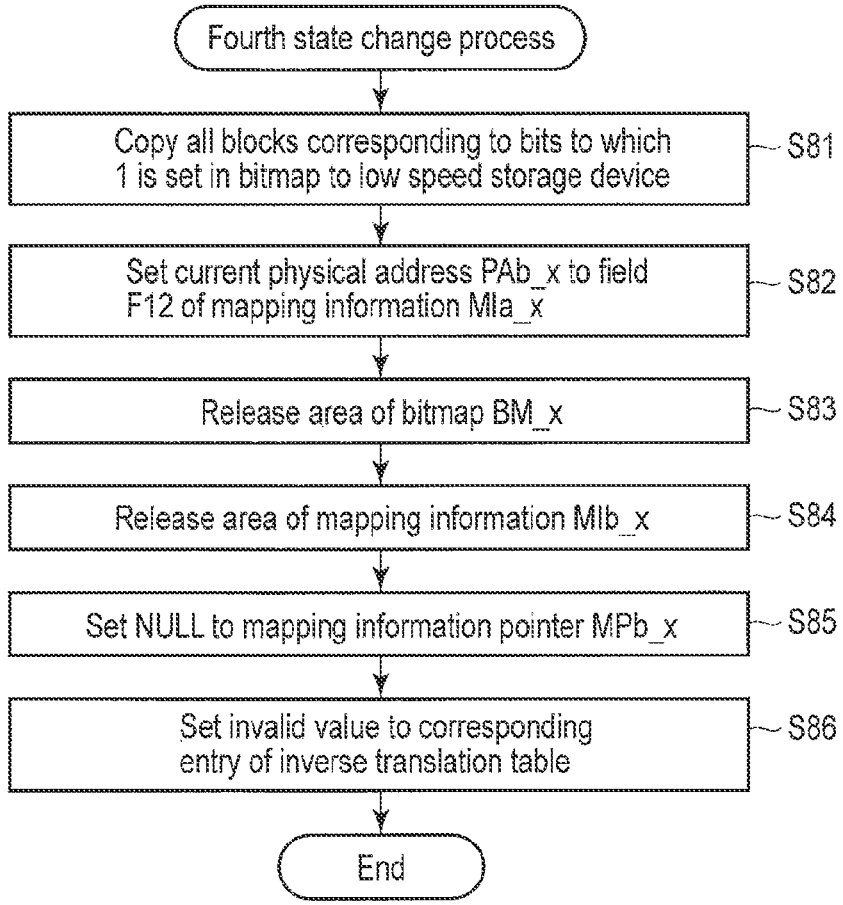
F I G. 16

STORAGE SYSTEM, STORAGE CONTROLLER, AND METHOD FOR MANAGING MAPPING BETWEEN LOCAL ADDRESS AND PHYSICAL ADDRESS

CROSS REFERENCE TO RELATED APPLICATIONS

This application is a Continuation application of PCT Application No. PCT/JP2013/059527, filed Mar. 29, 2013, the entire contents of which are incorporated herein by reference.

FIELD

Embodiments described herein relate generally to a storage system, a storage controller, and a method for managing mapping between a logical address and a physical address.

BACKGROUND

In recent years, storage systems including first and second storage devices of different access speeds have been developed. The first storage device is a high speed small-capacity device and the second storage device is a low speed large-capacity device when compared with the first storage device. A storage system is realized by hierarchically combining the first storage device (hereinafter, referred to as a high speed storage device) and the second storage device (hereinafter, referred to as a low speed storage device). Thus, the storage system is also called a hierarchical storage system.

The storage system further includes a storage controller. The storage controller accesses the high speed storage device or the low speed storage device in accordance with a read request or write request from a host computer (hereinafter, referred to as a host). In general, a logical unit (that is, a logical volume) is managed by dividing data into a plurality of clusters of data having a predetermined size. Such clusters of data are called chunks. The logical unit refers to a storage area recognized by the host as a logical storage drive. Logical addresses of chunks used at least by the host of a set of chunks in the logical unit are mapped to physical addresses of physical storage areas of the high speed storage device or the low speed storage device. That is, chunks used by the host are mapped to the high speed storage device or the low speed storage device.

The storage controller monitors an access condition to each chunk. As the index showing the access condition, access statistic information is generally used. The access statistic information is typified by the access frequency (frequency of use) or the total sum of data access amounts for each chunk in a predetermined period (monitoring period).

The storage controller selects chunks that need high speed access based on the access condition (access statistic information) of each chunk to which a physical storage area of the low speed storage device is allocated. That is, the storage controller selects a chunk of high access frequency or a chunk of a large access data amount as a chunk that needs high speed access. Such an access condition of a chunk that needs high speed access is called a first condition.

It is assumed here that the first chunk is selected based on the access condition of each chunk in a first monitoring period. It is also assumed that the first logical address of the first chunk is mapped to the first physical address of the first physical storage area of the low speed storage device.

In this case, the storage controller changes a mapping state of the first chunk as described below in order to realize high speed access to the first chunk. That is, the storage controller remaps the first logical address of the first chunk to the second physical address of the second physical storage area of the high speed storage device. In other words, the storage controller changes the mapping destination of the first chunk from the low speed storage device to the high speed storage device. At the same time, the storage controller migrates data in the first physical storage area to the second physical storage area and then releases the first physical storage area. Hereinafter, when access to the first chunk is requested by the host, the storage controller accesses the second physical storage area. Accordingly, an access request to the first chunk (that is, an access request to a chunk of high access frequency or a chunk of a large access data amount) can be executed faster than before remapping.

In addition, the storage controller selects a chunk that does not need high speed access based on the access condition (access statistic information) of each chunk to which a physical storage area of the high speed storage device is allocated. That is, the storage controller selects a chunk of low access frequency or a chunk of a small access data amount as a chunk that does not need high speed access. Such an access condition of a chunk that does not need high speed access is called a second condition.

It is assumed here that after the first chunk is remapped to the high speed storage device, the access condition of the first chunk changes from the second condition to the first condition in a second monitoring period succeeding the first monitoring period. In this case, the storage controller acquires a third physical storage area of the low speed storage device and changes the mapping destination of the first chunk to the low speed storage device again. At the same time, the storage controller migrates data in the second physical storage area to the third physical storage area and then releases the second physical storage area. Hereinafter, when access to the first chunk is requested by the host, the storage controller accesses the third physical storage area.

As described above, the chunk to be remapped is selected each time the monitoring period passes. However, the access condition to the second chunk in the first monitoring period is not necessarily the same in the subsequent second monitoring period. It is assumed, for example, that the access condition to the second chunk is near the boundary between the first condition and the second condition. The possibility of frequent remapping is high for such a second chunk. That is, it is highly probable that the mapping state of the second chunk is frequently changed and data migration from the low speed storage device to the high speed storage device and data migration from the high speed storage device to the low speed storage device frequently occur. Such a phenomenon is called the vibration of state transition.

If the access condition of the third chunk that is normally in the second condition changes to the first condition in a single monitoring period only, the transition of the mapping state described below also occurs. That is, a case in which the third chunk is temporarily mapped to the high speed storage device (more specifically, to a physical storage area of the high speed storage device) and then mapped to the low speed storage device again occurs. Conversely, if the access condition of the fourth chunk that is normally in the first condition changes to the second condition in a single monitoring period only, the transition of the mapping state described below also occurs. That is, a case which the fourth chunk is temporarily mapped to the low speed storage device and then mapped to the high speed storage device again occurs. It is difficult for the storage controller to predict such cases.

When the transition of the mapping state occurs, migration of data as described above occurs. That is, migration of data from the low speed storage device to the high speed storage device or migration of data from the high speed storage device to the low speed storage device occurs for the entire chunk where the transition of the mapping state should occur. The migration of data to the high speed storage device accompanied by data reading from the low speed storage device and the migration of data to the low speed storage device is accompanied by data writing to the low speed storage device. Therefore, if the number of target chunks in a mapping state change process executed for each monitoring period increases, a great deal of time will be needed to access the low speed storage device, leading to a longer processing time as a whole.

BRIEF DESCRIPTION OF THE DRAWINGS

FIG. 1 is a block diagram showing an exemplary hardware configuration of a computer system according to an embodiment;

FIG. 2 is a block diagram mainly showing an exemplary functional configuration of a storage controller shown in FIG. 1;

FIG. 3 is a diagram showing an example in which a logical unit includes a set of chunks;

FIG. 4 is a diagram illustrating an example of three mapping states applied in the embodiment;

FIG. 6 is a diagram showing a data structure example of address translation information and a bitmap;

FIG. 9 is a flow chart illustrating an exemplary procedure for a read process in the embodiment;

FIG. 10 is a flow chart illustrating an exemplary procedure for a write process in the embodiment;

FIG. 11 is a diagram showing a part of a flow chart illustrating an exemplary procedure for a mapping state change process in the embodiment;

FIG. 12 is a diagram showing the remaining flow chart illustrating the exemplary procedure for the mapping state change process;

FIG. 13 is a flow chart illustrating the exemplary procedure for a first state change process in the embodiment;

FIG. 15 is a flow chart illustrating the exemplary procedure for a Third state change process in the embodiment; and FIG. 16 is a flow chart illustrating the exemplary procedure for a fourth state change process in the embodiment.

DETAILED DESCRIPTION

Figure 5:
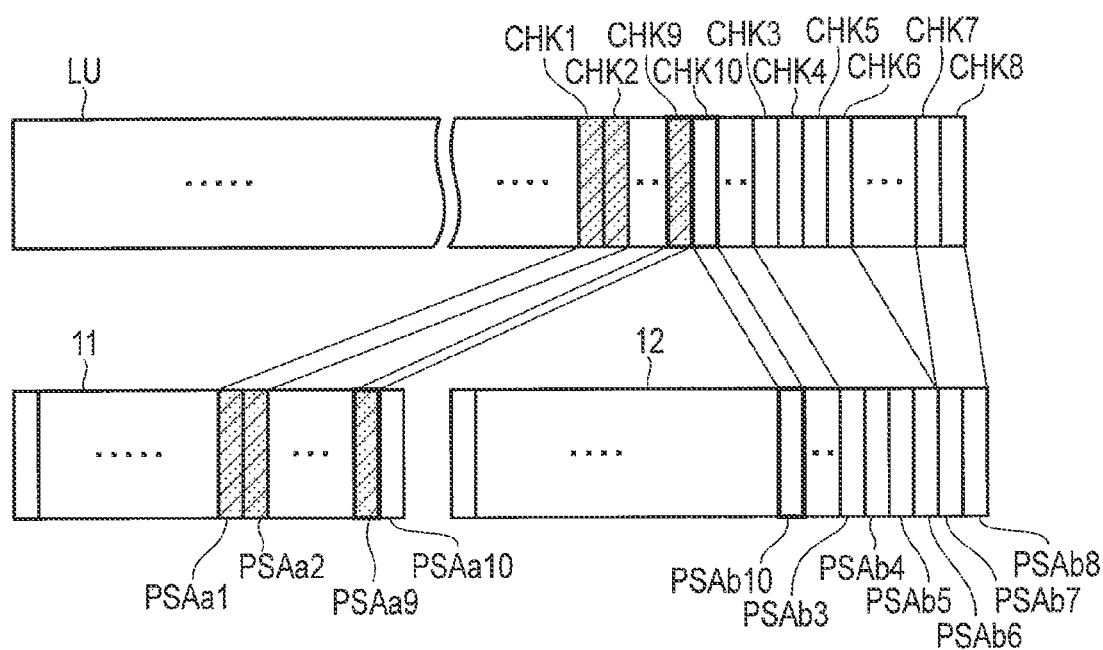
FIG. 5 is a diagram illustrating an example of three mapping states applied in the embodiment.

In general, according to one embodiment, a storage system comprises a first storage device, a second storage device and a storage controller. The second storage device is configured to be slower and include a larger capacity than the first storage device. The storage controller is configured to control access to the first storage device and access to the second storage device. The storage controller comprises a mapping manager, an address translation unit and an access controller. The mapping manager is configured to manage to which of a first state, a second state, and a third state each chunk of a first size in a logical unit is set. The first state is a state in which a logical address of the chunk is mapped to a physical address of a physical storage area in the first storage device by a first type of mapping information. The second state is a state in which the logical address is mapped to a physical address of a physical storage area in the second storage device by the first type of mapping information. The third state is a state in which the logical address is mapped to the physical address of the physical storage area in the first storage device by the first type of mapping information and also mapped to the physical address of the physical storage area in the second storage device by a second type of mapping information. The address translation unit is configured to translate the logical address specified by arced request or a write request from a host apparatus into the physical address of the physical storage area in the first storage device or the second storage device mapped by the first type of mapping information. The access controller is configured to access the first storage device or the second storage device based on the translated physical address. The mapping manager monitors an access condition to the chunk for each of the chunks in the logical unit. The mapping manager changes a first chunk from the second state to the third state if the access condition to the first chunk is a first condition that needs high speed access and the first chunk is in the second state. The mapping manager changes the first chunk from the third state to the first state if the first condition continues after the first chunk is changed from the second state to the third state. The mapping manager changes the first chunk from the third state to the second state if the access condition to the first chunk changes to a second condition that does not need the high speed access after the first chunk is changed from the second state to the third state.

FIG. 1 is a block diagram showing an exemplary hardware configuration of a computer system according to an embodiment. The computer system shown in FIG. 1 is configured by a storage system 10 and a host computer (hereinafter, called a host) 20. The storage system 10 is connected to the host 20 via a host interface bus 30. In the embodiment, the host interface bus 30 is a fibre channel (FC). However, the host interface bus 30 may be an interface bus other than FC such as Small Computer System Interface (SCSI), Serial Attach SCSI (SAS), Internet SCSI (iSCSI), Ethernet (registered trademark), or Serial AT Attachment (SATA).

The host 20 is a physical computer like a server or client personal computer (client PC). An application program to access data in the storage system 10 operates in the host 20. Following the application program, the host 20 utilizes the storage system 10 via the host interface bus 30.

The storage system 10 includes a high speed storage device 11 (first storage device), a low speed storage device 12 (second storage device), and a storage controller 13. The high speed storage device 11 is configured by, for example, a high speed, low-capacity flash storage device. The low speed storage device 12 is configured by, for example, a low speed, large-capacity hard disk drive (HDD) array device compared with the high speed storage device 11. The HDD array device (that is, the HDD array device used as the low speed storage device 12) is, for example, a storage device of a RAID (Redundant Arrays of Inexpensive Disks or Redundant Arrays of Independent Disks) configuration including a plurality of HDDs.

On the other hand, the flash storage device (that is, the flash storage device used as the high speed storage device 11) is, for example, a storage device of the RAID configuration including a group of memory boards on which a plurality of flash memories are mounted. In the embodiment, it is assumed that each of a group of memory boards is not compatible with the HDD. However, instead of each of a group of memory boards, a solid state drive (SSD) having compatibility with the HDD may be used.

The high speed storage device 11 and the low speed storage device 12 are connected to the storage controller 13 via a storage interface bus 14. In the embodiment, the storage interface bus 14 is an PC (fibre channel). However, like the host interface bus 30, the storage interface bus 14 may be an interface bus other than the FC.

The storage controller 13 receives a read request or write request from the host 20 by specifying a logical address. The storage controller 13 translates, by an address translation function, the specified logical address into a physical address (more specifically, a device number and a physical address of the storage device) indicating a physical storage area in the storage device to which the logical address is mapped. Based on the physical address, the storage controller 13 accesses the high speed storage device 11 and the low speed storage device 12.

The storage controller 13 includes a CPU 131, a memory 132, and an HDD 133. The CPU 131 executes a process requested from the storage controller 13 following program codes of a control program stored in a control program area 132a described later.

The memory 132 is, for example, a volatile memory configured by using a plurality of DRAMs. The memory 132 is still faster than the high speed storage device 11. The HDD 133 is a local storage device and is used to store the control program and address translation information described later. Instead of the HDD 133, a storage device mounted with a plurality of flash memories may also be used.

The memory 132 includes the control program area 132a, a work area 132b, a cache memory area 132c, an address translation information area 132d, and a write position information area 132e. The control program area 132a is used to store a control program executed by the CPU 131. The control program is pre-stored in the HDD 133 and loaded from the HDD 133 into the control program area 132a when the storage controller 13 is activated.

The work area 132b is used to store temporary data used when the CPU 131 executes the control program. The cache memory area 132c is used as a cache memory to temporarily store data read from the high speed storage device 11 or the low speed storage device 12.

The address translation information area 132d is used to store address translation information. The write position information area 132e is used to store write position information. The address translation information and write position information will be described later.

In the embodiment, as shown in FIG. 1, the storage controller 13 is provided independently of the host 20. However, the storage controller 13 may be contained in the host 20. In such a case, the storage controller 13 (more specifically, the function of the storage controller 13) may be realized by using a portion of the function of the operating system (OS) of the host 20.

Alternatively, the storage controller 13 may be included in a card used by being inserted into a card slot of the host 20. In addition, a portion of the storage controller 13 may be contained in the host 20 and the remaining portion of the storage controller 13 may be included in a card. Further, the host 20, the storage controller 13, and a portion or all of the high speed storage device 11 and the low speed storage device 12 may be accommodated in a housing.

FIG. 2 is a block diagram mainly showing an exemplary function configuration of the storage controller 13 shown in FIG. 1. The storage controller 13 includes a logical unit manager 134, an address translation unit 135, an access statistic collection unit 136, and an access controller 137. In the embodiment, the above functional elements 134 to 137 are software modules realized by a control program being executed by the CEO 131 of the storage controller 13 shown in FIG. 1. However, a portion or all of die functional elements 134 to 137 may be realized by hardware modules.

The logical unit manager 134 manages one logical unit or more. The logical unit refers to a storage area recognized by the host 20 as a logical storage drive. In the embodiment, it is assumed that one logical unit LU (see FIG. 3) is managed by the logical unit manager 134 to simplify the description. The logical unit manager 134 manages the logical unit LU by dividing the entire storage area (more specifically, the entire logical-storage area) of the logical unit LU into chunks (more specific logical chunks) CHK of a first size (for example, 4 megabytes). That is, the logical unit LU includes a set of chunks CHK. In this case, the entire storage area of each of the high speed storage device 11 and the low speed storage device 12 is managed by dividing the storage area into physical storage areas PSA of the same size as the chunk CHK.

FIG. 3 shows an example in which the logical unit LU includes a set of the chunks CHK including chunks CHK1 to CHK10. In the embodiment, a case in which the storage system 10 functions as a block device accessed in units of blocks is assumed. Thus, each chunk CHK is divided into blocks of a second size for management. The second size is 1/n (n is an integer greater than 1) of the first size (4 megabytes). In the embodiment, the second size is 512 bytes and thus, n is 8,192 (4 megabytes/512 bytes). That is, each chunk CHK includes 8,192 blocks.

FIG. 2 is referred to again. The logical unit manager 134 defines (constructs) the logical unit LC by virtualizing storage areas of the high speed storage device 11 and the low speed storage device 12. In the embodiment, the storage capacity of the logical unit LU is larger than the total sum of the storage capacities of the high speed storage device 11 and the low speed storage device 12. The logical unit LU is also called a logical volume. Read/write operations from an apparatus such as the host 20 that uses the storage system 10 are performed on the logical unit LU.

The logical unit manager 134 includes a mapping manager 134a. The mapping manager 134a manages a mapping state of each chunk CHK in the logical unit LU by using the address translation information area 132d, the write position information area 132e, and further the work area 132b. The chunk CHK is set to one of a first state, a second state, and a third state.

The first state refers to a state in which the logical address of the chunk CHK is mapped to a physical address of the physical storage area in the high speed storage device 11 by a first type of mapping information MIa. In the description that follows, the first state will be called a normal high speed state (or a high speed state).

The second state refers to a state in which the logical address is mapped to a physical address of the physical storage area in the low speed storage device 12 by the first type of mapping information MIa. In the description that follows, the second state will be called a low speed state.

The third state refers to a state in which the logical address is mapped to a physical address of the physical storage area in the high speed storage device 11 by the first type of mapping information MIa and to a physical address of the physical storage area in the low speed storage device 12 by a second type of mapping information MIb. In the description that follows, the third state will be called a tentative high speed state.

The mapping manager 134a monitors, for each chunk CHK in the logical unit LU, an access condition to the chunk CHK. More specifically, the mapping manager 134a monitors an access condition to each chunk CHK by referring to access statistic information. In the embodiment, the access statistic information is the value of an access counter CNT included in the first type of mapping information MIa of each chunk CHK. Based on the access condition to each chunk CHK, the mapping manager 134a changes the mapping state of the chunk CHK.

The address translation unit 135 translates a logical address LAa specified by a read request or write request from the host 20 into a physical address PAa (more specifically, a device number DN and a physical address PAa) of the high speed storage device 11 or the low speed storage device 12 based on address translation information.

The access statistic collection unit 136 collects access statistic information showing the access condition to each chunk CHK. As described above, the access statistic information is the value of the access counter CNT included on the first type of mapping information MIa of each chunk CHK (that is, the value of the access counter CNT corresponding to the chunk CHK). Here, the access counter corresponding to a chunk CHKt is denoted by CNT_t.

In the embodiment, the access counter CNT_t is used to count the number of times of access to the chunk CHKt. More specifically, the access counter CNT_t is used to count the number of times of both of read access and write access to the chunk CHLt as the number of times of access. The access counter CNT_t is cleared to the initial value 0 each time a predetermined monitoring period of the access condition is started. In the embodiment, the monitoring period is constant. However, the monitoring period does not necessarily need to be constant. In this case, the value of the access counter CNT_t may be normalized in accordance with the length of the monitoring period.

The access counter CNT_t may also be used to count the total sum of data amounts of access to the chunk CHKt, for example, the total sum of data amounts of both of read access and write access.

The access controller 137 accesses the high speed storage device 11 or the low speed storage device 12 based on the physical address PAa (the device number DN and the physical address PAa) translated from the logical address LAa.

The memory 132 includes, as shown in FIGS. 1 and 2, the work area 132b, the address translation information area 132d, and the write position information area 132e. A partial area of the work area 132b is used, as shown in FIG. 2, to store a transition candidate list CL. The address translation information area 132d is used to store address translation information ATI. The address translation information ATI includes, as shown in FIG. 2, a hash table HT, address translation hash lists HL_0 to HL_n−1, a second type of mapping information MIb, and an inverse translation table ITT. The write position information area 132e is used to store write position information indicating the position where data is written in units of blocks in association with each chunk. In the embodiment, a bitmap BM is used as the write position information. The information is stored in the HDD 133 and loaded from the HDD 133 into the memory 132 when, for example, the storage system 10 is activated. In addition, information loaded into the memory 132 is saved in the HDD 133 when necessary or when the storage system 10 is turned off.

FIGS. 4 and 5 are diagrams illustrating an example of three mapping states applied in the embodiment. In FIG. 4, the chunks CHK1 and CHK2 in the logical unit LU are in the normal high speed state. That is, logical addresses of the chunks CHK1 and CHK2 are mapped to physical addresses of physical storage areas PSAa1 and PSAa2 in the high speed storage device 11. The mapping state (that is, the normal high speed state) is managed by using the first type of mapping information MIa. When access to the chunk CHK1 or the chunk CHK2 is requested from the host 20, the access controller 137 accesses the physical storage area PSAa1 or the physical storage area PSAa2.

Also in FIG. 4, the chunks CHK3 to CHK8 in the logical unit LU are in the low speed state. That is logical addresses of the chunks CHK3 to CHK8 are mapped to physical addresses of physical storage areas PSAb3 to PSAb8 in the low speed storage device 12. The mapping state (that is, the low speed state) is managed by using the first type of mapping information MIa. When access to one of the chunk CHK3 to the chunk CHK8 is requested from the host 20, the access controller 137 accesses the corresponding physical storage area of the physical storage areas PSAb3 to PSAb8.

In the conventional technology, each chunk can take two mapping states, the above high speed state (first state) and low speed state (second state). In the embodiment, however, in addition to the high speed state and low speed state, as described above, the tentative high speed state as the third state is present as mapping states that can be taken by each chunk.

In FIG. 4, the chunks CHK9 and CHK10 in the logical unit LU are in the tentative high speed state. That is, logical addresses of the chunks CHK9 and CHK10 are mapped to physical storage areas PSAa9 and PSAa10 in the high speed storage device 11 and also mapped to physical storage areas PSAb9 and PSAb10 in the low speed storage device 12. The former mapping state is managed by using the first type of mapping information MIa and the latter mapping state is managed by using the second type of mapping information MIb.

Thus, the mapping state (tentative high speed state) of the chunks CHK9 and CHK10 is managed by using the first type of mapping information MIa and the second type of mapping information MIb. As is evident from such mapping, data (actual data) of the chunks CHK9 and CHK10 in the tentative high speed state is present in both the high speed storage device 11 and the low speed storage device 12.

When access (read access or write access) to the chunk CHK9 or chunk CHK10 in the tentative high speed state is requested from the host 20, the access controller 137 accesses the physical storage area PSAa9 or physical storage area PSAa10. Accordingly, even if the chunk CHK9 or chunk CHK10 is a chunk whose access frequency is high (or whose access data amount is large), the access controller 137 can execute an access request to the chunk CHK9 or chunk CHK10 at high speed.

It is assumed here that, for example, a write to the chunk CHK10 is requested. The write request does not necessarily request to write to the entire chunk CHK10. Thus, in the embodiment, a write request that requests to write to a partial area in the chunk CHK10 in units of blocks is taken into consideration. More specifically, the mapping manager 134a manages positions of blocks included in the chunk and to which data is written (or whose data is updated) by using the bitmap BM (see FIG. 6) associated with the chunk.

Now, it is assumed that the state in which the access frequency of one of the chunks CHK9 and CHK10 is high is temporary. Here, it is assumed that the state in which the access frequency of the chunk CHK10 is high is temporary and the chunk CHK10 returns to a state in which the access frequency is low. On the other hand, a state in which the access frequency of the chunk CHK9 is high is assumed to be continuing.

In this case, the mapping manager 134a changes the chunk CHK9 from the tentative high speed state to the normal high speed state. The mapping manager 134a also changes the chunk CHK10 from the tentative high speed state to the low speed state. FIG. 5 shows an example of the mapping state of the chunks CHK1 to CHK10 including the mapping state of the chunks CHK9 and CHK10 when the above changes are made.

As is evident from FIG. 5, the chunk CHK9 (more specifically, the logical address of the chunk CHK9) is mapped to only the physical storage area PSAa9 (more specifically, the physical address of the physical storage area PSAa9) in the high speed storage device 11. This mapping state is managed by using the first type of mapping information MIa. The state in which the chunk CHK9 is mapped to the physical storage area PSAb9 in the low speed storage device 12 is released. That is, the second type of mapping information MIb concerning the chunk CHK9 is nullified. Note that no data is migrated between the high speed storage device 11 and the low speed storage device 12 to change the mapping state of the chunk CHK9 from the tentative speed state to the normal high speed state.

On the other hand, the chunk CHK10 is mapped to only the physical storage area PSAb10 in the low speed storage device 12. This mapping state managed by using the first type of mapping information MIa. That is, the first type of mapping information MIa is updated from the state in which the chunk CHK10 is mapped to the physical storage area PSAa10 in the high speed storage device 11 to the state in which the chunk CHK10 is mapped to the physical storage area PSAb10 in the low speed storage device 12. In this case, the second type of mapping information. MIb concerning the chunk CHK10 is nullified. Note that no data is migrated between the high speed storage device 11 and the low speed storage device 12 to change the mapping state of the chunk CHK10 from the tentative high speed state to the low speed state.

FIG. 6 shows a data structure example of the address translation information. ATI and the bitmap BM (write position information). The address translation information ATI includes the hash table HT and n address translation hash lists HL_0 to HL_n−1. The address translation information. ATI also includes the second type of mapping information MIb. The address translation information ATI further includes the inverse translation table ITT. However, the inverse translation table ITT is not shown in FIG. 6.

The hash table HT has entries ENT_0 to ENT_n−1 corresponding to mutually different hash values HV0 to HVn−1, respectively. In the embodiment, logical addresses of all chunks CHK in the logical unit LU are classified into n groups G0 to Gn−1 based on hash values of the logical addresses. The group Gi (i=0, 1, . . . , n−1) is a set of logical addresses whose hash value is HVi (HVi=i). The entry ENT_i of the hash table HT (that is, the entry ENT_i corresponding to the hash value HVi) stores a list pointer LPi pointing to a first element HLE of the address translation hash list HL_i.

Each element (hereinafter, called a hash list element) HLE of the address translation hash list HL_i has fields F1 and F2. The first type of mapping information MIa is set to the field F1 of the hash list element HLE. A next pointer NPa is set to the field F2 of the hash list element HLE. The next pointer NPa points to the next hash list element HLE in the address translation hash list HL_i. However, NULL (that is, NPa=NULL) indicating that there is no subsequent hash list element HLE is set to the field F2 of the last hash list element HLE in the address translation hash list HL_i.

The first type of mapping information MIa has fields F11 to F15. The logical address LAa is set to the field F11 of the first type of mapping information MIa. The logical address LAa is a logical address of the chunk CHK whose mapping state is managed by the first type of mapping information MIa and belongs to the group Gi.

The physical address PAa is set to the field. F12 of the first type of mapping information MIa. The physical address PAa shows the physical storage area PSA in the storage device (the high speed storage device 11 or the low speed storage device 12) to which the logical address LAa of the chunk CHK is mapped. The device number DN is set to the field F13 of the first type of mapping information MIa. The device number DN is an identifier to identify the storage device to which the physical storage area PSA indicated by the physical address PAa set to the field F12 belongs and is a number specific to the storage device. That is, the device number DN shows the storage device to which the logical address LAa set to the field F11 is mapped.

A mapping information pointer MPb is set to the field F14 of the first type of mapping information MIa. When the mapping information pointer MPb is valid (non-NULL), the valid mapping information pointer MPb points to the second type of mapping information MIb. In this case, the physical address PAa included in the first type of mapping information MIa indicates the physical storage area PSA (=PSAa) in the high speed storage device 11. When the logical address LAa included in the first type of mapping information MIa is mapped to not only the physical address PAa of the physical storage area PSA in the high speed storage device 11, but also a physical address PAb of a physical storage area PSAb the low speed storage device 12, the valid mapping information pointer MPb is set to the field F14 of the first type of mapping information MIa.

The access counter CNT is set to the field F15 of the first type of mapping information MIa. The access counter CNT is used, as described above, to count the number of times of accessing the chunk CHK managed based on the first type of mapping information MIa (that is, the chunk CHK having the logical address LAa). Thus, the first type of mapping information. MIa includes the logical address LAa, the physical address PAa, the device number DN, the mapping information pointer MPb, and the access counter CNT.

On the other hand, the second type of mapping information MIb has fields F21 and F22. As described above, the second type of mapping information MIb is pointed to by the mapping information pointer MPb included in the first type of mapping information MIa. The physical address PAa is set to the field F21 of the second type of mapping information MIb (more specifically, the second type of mapping information MIb associated with the first type of mapping information MIa). The physical address PAb shows the physical storage area PSAb in the low speed storage device 12 to which the chunk CHK indicated by the first type of mapping information MIa is mapped.

A bitmap pointer BP is set to the field F22 of the second type of mapping information MIb. The bitmap pointer BP points to the bitmap BM. The bitmap BM is formed from a sequence of bits matching the number of blocks 8,192 (n=8, 192) included in the chunk CHK indicated by the first type of mapping information MIa. That is, the size of the bitmap BM is 1 kilobyte (8,192 bits). Each bit of the bitmap BM is used to record whether data in the corresponding block in the chunk CHK is updated by writing data into the block. That is, the bitmap BM indicates positions (write positions) of blocks where data is updated (into which data is written) in the chunk CHK.

In contrast to the embodiment, the second type of mapping information MIb may be included in the first type of mapping information MIa. In such a case, the address translation information ATI needs to have a field for the second type of mapping information MIb for each piece of the first type of mapping information MIa regardless of whether the valid second type of mapping information MIb is present. Therefore, the site of the area (that is, the address translation information area 132d) of the memory 132 needed to store the address translation information ATI increases.

Thus, to prevent the size of the address translation information ATI from increasing, 1 bit (for example, the highest-order bit) that is not used from any field of the first type of mapping information MIa may be used as a flag bit as described below. The flag bit indicates whether or not the mapping state of the chunk CHK indicated by the first type of mapping information MIa is the tentative high speed state. In this case, like the first type of mapping information. MIa, the second type of mapping information MIb may be stored in a hash list.

Figures 7, 8:
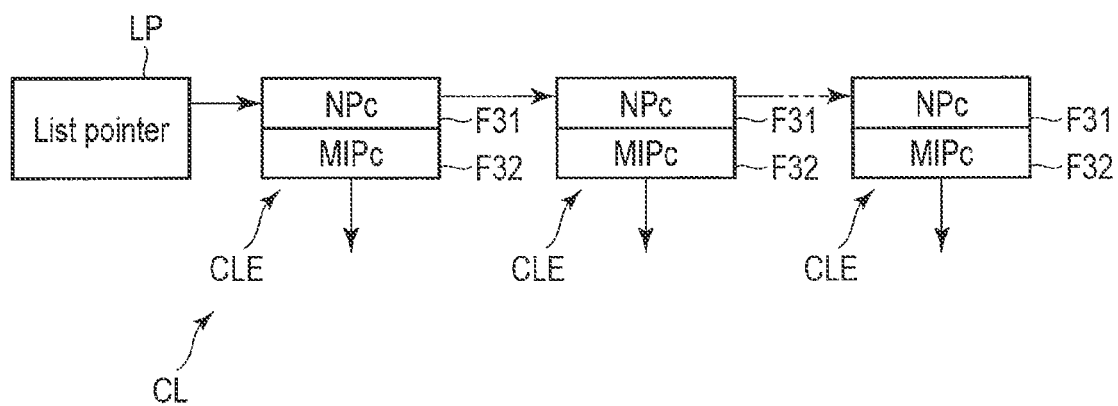
FIG. 7 is a diagram showing a data structure example of an inverse translation table included in the address translation information.
FIG. 8 is a diagram showing a data structure example of a transition candidate list.

FIG. 7 shows a data structure example of an inverse translation table ITT included in the address translation information ATI. The inverse translation table ITT shown in FIG. 7 has N entries. N indicates, for example, the number of the physical storage areas PSA included in the high speed storage device 11 and having the same size as the chunk CHK. The inverse translation table ITT is used to store physical addresses 0 to N−1 of the N physical storage areas PSA in association with logical addresses of the chunks CHK mapped to the physical addresses 0 to N−1. A specific value, instead of a logical address, is set to entries included in the inverse translation table ITT and associated with physical addresses to which chunks CHK are not mapped. In the embodiment, the specific value is a negative value and, for example, is −1.

The inverse translation table ITT shown in FIG. 7 is used by the address translation unit 135 to translate (that is, to inversely translate) the physical address of the physical storage area PSA of the high speed storage device 11 into a logical address at high speed. The processing time of a mapping state change process described later for changing the mapping state can be reduced by the high speed translation.

Incidentally, the inverse translation table ITT is not necessarily needed by the address translation unit 135 to translate a physical address of the high speed storage device 11 into a logical address. That is, the address translation unit 135 can also translate a physical address of the high speed storage device 11 into a logical address by searching for the address translation hash list HL_i. However, the translation speed decreases when compared with a case in which the inverse translation table ITT is used. Moreover, in addition to the inverse translation table ITT, the address translation information ATI may include an inverse translation table used to translate a physical address of the low speed storage device 11 into a logical address.

FIG. 8 shows a data structure example of a transition candidate list CL. The transition candidate list CL is used to store the chunks CHK to be changed from the low speed state to the tentative high speed state as transition candidates. The transition candidate list CL includes a list pointer LP and an array of elements (hereinafter, called transition candidate list elements) CLE of the transition candidate list CL. The list pointer LP points to the first transition candidate list element CLE in the array of the transition candidate list elements CLE.

Each transition candidate list element CLE has fields F31 and F32. The next pointer NPc is set to the field F31 of the transition candidate list element CLE. The next pointer NPc points to the transition candidate list element CLE added to the transition candidate list CL next to the transition candidate list, element CLE including the next pointer NPc. However, NULL (that is, NPc=NULL) indicating that no subsequent transition candidate list element CLE is present is set to the field F31 of the transition candidate list element CLE added last.

A mapping information pointer MIPc is set to the field F32 of the transition candidate list element CLE. The mapping information pointer MIPc points to the hash list element HLE (see FIG. 6) including the first type of mapping information MIa indicating the current mapping state of the corresponding chunk.

In the embodiment, if the number of times of access to the chunk CHK currently in the low speed state reaches a threshold (first threshold TH1 in the access process (the read process or write process), the mapping manager 134a adds the chunk CHK to the transition candidate list CL as a transition candidate. That is, the mapping manager 134a adds the transition candidate list element CLE pointing to the first type of mapping information MIa corresponding to the transition candidate to the transition candidate list CL.

The mapping manager 134a can easily identify chunks (transition candidates) to be changed from the low speed state to the high speed state simply by referring to the transition candidate list CL in the mapping state change process (first state change process). However, the transition candidate list CL is not necessarily needed. That is, the mapping manager 134a can also identify chunks to be changed from the low speed state to the high speed state by searching for the hash list elements HLE of the address translation hash list HL_i. In other words, the mapping manager 134a only needs to search the address translation hash lists HL_0 to HL_n−1 for the first type of mapping information MIa whose access counter CNT is equal to the threshold TH1 or more and whose mapping information pointer MPb is NULL. However, the storage capacity of the low speed storage device 12 is large when compared with the high speed storage device 11 and thus, the number of chunks in the low speed state is generally very large. Therefore, the time needed to search for transition candidates becomes longer than when the transition candidate list CL is used.

Next, the read process in the embodiment will be described with reference to FIG. 9. FIG. 1 is a flow chart illustrating an exemplary procedure for the read process. It is assumed that a read request specifying a data read is sent from the host 20 to the storage system 10 via the host interface bus 30. Then, it is assumed that the storage controller 13 of the storage system 10 receives the read request from the host 20. To simplify the description, it is assumed that reading of data in the first block (that is the target block) of the chunk CHKt (that is, the target chunk CHKt) specified by the logical address LAa_t is requested by the read request from the host 20. In this case, the offset address showing a relative position in the target chunk CHKt of the target block is 0.

In the description that follows, the first type of mapping information concerning the target chunk CHKt is denoted by MIa_t. Also, the physical address and the device number included in the first type of mapping information MIa_t are denoted by PAa_t and DN_t, respectively. Also, the mapping information pointer and the access counter included in the first type of mapping information MIa_t are denoted by MPb_t and CNT_t, respectively. When the mapping information pointer MPb_t is non-NULL, the second type of mapping information pointed to by the mapping information pointer MPb_t is denoted by MIb_t. The physical address and the bitmap pointer included in the second type of mapping information MIb_t are denoted by PAb_t and BP_t, respectively. Also, the bitmap pointed to by the bitmap pointer BP_t is denoted by BM_t. Further, the transition candidate element in the transition candidate list CL indicating the target chunk CHKt as a transition candidate is denoted by CLE_t.

The address translation unit 135 of the storage controller 13 calculates a hash value HVx of the logical address LAa_t based on the logical address LAa_t of the target chunk CHKt including the target block specified by the read request from the host 20 (step S1). The hash value HVx (HVx=x) is one of 0 to n−1.

Next, the address translation unit 135 acquires the list pointer LPx set to the entry ENT_x of the hash table HT corresponding to the hash value HVx (step S2). In step the address translation unit 135 searches the address translation hash list HL_x pointed to by the list pointer LPx for the first type of mapping information MIa_t including the logical address LAa_t. Accordingly, the address translation unit 135 acquires the physical address PAa_t (more specifically, the physical address PAa_t and the device number DN_t) included in the first type of mapping information MIa_t. That is, the address translation unit 135 translates the logical address LAa_t into the physical address PAa_t. Instead of the address translation hash list HL_i, other data structures such as a balanced tree may be used to search for mapping information (address translation information).

The access controller 137 reads data (actual data) from a physical storage area of the high speed storage device 11 or the low speed storage device 12 indicated by the physical address PAa_t (step S3). If the target block is not the first block in the target chunk CHKt, it is necessary for the address translation unit 135 to calculate the physical address (target physical address) of the physical storage area from which data is read, as follows. The address translation unit 135 adds the offset address indicating the relative position in the target chunk CHKt of the target block to the physical address PAa_t. The target physical address is thereby calculated. Which of the high speed storage device 11 and the low speed storage device 12 to read data from is indicated by the device number DN_t included in the first type of mapping information MIa_t.

When step S3 is executed, the access statistic collection unit 136 increments the access counter CNT_t included in the first type of mapping information MIa_t by 1 (step S4). When the access counter CNT_t is incremented by 1, the mapping manager 134*a* determines whether the value CNT_t of the access counter CNT_t is equal to the threshold TH1 by comparing the access counter CNT_t with the threshold TH1 (step S5). The access counter CNT_t is access statistic information indicating the access condition (access frequency) to the target chunk CHKt whose mapping state is managed by using the first type of mapping information MIa_t. Therefore, comparing the counter value CNT_t with the threshold TH1 by the mapping manager 134*a* is equivalent to monitoring the access condition to the target chunk CHKt.

If the counter value CNT_t is equal to the threshold TH1 (Yes in step S5), the mapping manager 134*a* determines that the access condition to the target chunk CHKt is the first condition that needs high speed access using the high speed storage device 11. In this case, the mapping manager 134*a* determines whether the storage device from which data is read in step S3 is the low speed storage device 12 (step S6). That is, the mapping manager 134*a* determines whether the device number DN_t included in the first type of mapping information MIa_t indicates the low speed storage device 12. Furthermore, the mapping manager 134*a* determines whether the mapping state of the target chunk CHKt is in the low speed state.

If the storage device from which data has been read is the low speed storage device 12 (Yes in step S6), the mapping manager 134*a* determines that it is necessary to change the target chunk CHKt in the first condition from the low speed state to the tentative high speed state. In this case, the mapping manager 134*a* adds the target chunk CHKt to the transition candidate list CL (step S7). That is, the mapping manager 134*a* adds, to the transition candidate list CL, the transition candidate list element CLE_t to which the mapping information pointer MIPc_t pointing to the first type of mapping information. MIa_t is set. The read process is thereby finished.

On the other hand, if the counter value CNT_t is not equal to the threshold TH1 (No in step S5), the mapping manager 134*a* determines that the target chunk CHKt is already added to the transition candidate list CL or the access condition to the target chunk CHKt is the second condition that does not need high speed access. In the former case, the counter value CNT_t exceeds the threshold TH1 and in the latter case, the counter value CNT_t is less than the threshold TH1. In this case, the read process is finished. The read process is also finished if the storage device from which data has been read is not the low speed storage device 12 (No in step S6).

Next, the write process in the embodiment will be described with reference to FIG. 10. FIG. 10 is a flow chart illustrating an exemplary procedure for the write process. It is assumed that a write request specifying a data write is sent from the host 20 to the storage system 10 via the host interface bus 30. Then, it is assumed that the storage controller 13 of the storage system 10 receives the write request from the host 20. To simplify the description, it is assumed that writing of data to the first block (that is, the target block) of the chunk CHKt (that is, the target chunk CHKt) specified by the logical address LAa_t is requested by the write request from the host 20.

First, the address translation unit 135 of the storage controller 13 searches for the first type of mapping information MIa_t including the logical address LAa_t by executing steps S11 and S12 corresponding to steps S1 and S2 in the above read process.

The address translation unit 135 translates the logical address LAa_t into the physical address PAa_t based on the first type of mapping information MIa_t.

The access controller 137 writes data (actual data) to a physical storage area of the high speed storage device 11 or the low speed storage device 12 indicated by the physical address PAa_t (step S13). If the target block is not the first block in the target chunk CHKt, as described above, it is necessary for the address translation unit 135 to calculate the physical address of the physical storage area to which data is written by using an offset address indicating the relative position in the target chunk CHKt of the target block. When step S13 is executed, the access statistic collection unit 136 increments the access counter CNT_t included in the first type of mapping information MIa_t by 1 (step S14).

On the other hand, the mapping manager 134*a* determines whether the mapping information pointer MPb_t included in the first type of mapping information MIa_t is non-NULL (that is, valid) (step S15). If the mapping information pointer MPb_t is non-NULL (Yes in step S15), the mapping manager 134a proceeds to step S16.

In step S16, the mapping manager 134a first refers to the second type of mapping information MIb_t pointed to by the mapping information pointer MPb_t and identifies the bitmap BM_t pointed to by the bitmap pointer BP_t included in the second type of mapping information MIb_t. In step S16, the mapping manager 134a further sets 1 to a bit included in the bitmap BM_t and corresponding to the position of a block to which data is written.

After step S16 is executed, the mapping manager 134a proceeds to step S17. If the mapping information pointer MPb_t is NULL (No in step S15), the mapping manager 134a proceeds to step S17 by skipping step S16. In step S17, the mapping manager 134a determines whether the value CNT_t of the access counter CNT_t is equal to the threshold TH1 (step S17). If the counter value CNT_t is equal to the threshold TH1 (Yes in step S17), the mapping manager 134a determines that the access condition to the tar et chunk CHKt is the first condition that needs hi speed access using the high speed storage device 11. In this case, the mapping manager 134a determines whether the storage device to which data is written in step S13 is the low speed storage device 12 (step S18).

If the storage device to which data has been written is the low speed storage device 12 (Yes in step S18), the mapping manager 134a determines that the target chunk CHKt in the first condition needs to be changed from the low speed state to the tentative high speed state. In this case, the mapping manager 134a adds the target chunk CHKt to the transition candidate list CL (step S19). The write process is thereby finished.

On the other hand, if the counter value CNT_t is not equal to the threshold TH1 (No in step S17), the mapping manager 134a determines that the target chunk CHKt is already added to the transition candidate list CL or the access condition to the target chunk CHKt is the second condition that does not need high speed access. In this case, the write process is finished. The write process is also finished if the storage device to which data has been written is not the low speed storage device 12 (No step S18).

In the embodiment, the access counter CNT_t included in the first type of mapping information MIa_t is used commonly for read access and write access. That is, regardless of read access or write access, the access counter CNT_t counts the number of times of access (access frequency) to the chunk CHK. However, the first type of mapping information MIa_t may include, for example, a first access counter that counts the number of times of read access to the chunk CHKt and a second access counter that counts the number of times of write access to the chunk CHKt. In this case, the access statistic collection unit 136 may acquire statistic information representing the access condition to the chunk CHKt by assigning weights specific to read access and write access to values of the first and second access counters respectively. Alternatively, the access counter CNT_t may also be used to count the number of times of one of read access and write access to the chunk CHKt as the number of times of access. This also applies when the access counter CNT_t (or the first and second access counters) is used to count the total sum of data amounts of access to the chunk CHKt.

Next, in the embodiment, the mapping state change process for changing the mapping state of a chunk will be described with reference to FIGS. 11 and 12. FIG. 11 is a diagram showing a part of a flow chart illustrating an exemplary procedure for the mapping state change process and FIG. 12 is a diagram showing the remaining flow chart illustrating the exemplary procedure for the mapping state change process.

The mapping manager 134a executes the mapping state change process shown by the flow chart in FIGS. 11 and 12 as follows each time a predetermined monitoring period passes. First, the mapping manager 134a sets a variable j to the initial value 0 (step S21). The variable j refers to the j-th entry of the inverse translation table ITT. The j-th entry of the inverse translation table ITT is associated with the physical address j (that is, the physical storage area j specified by the physical address j) of the high speed storage device 11.

Next, the mapping manager 134a refers to the j-th entry of the inverse translation table ITT and thus determines whether the chunk CHKx corresponding to the physical storage area j of the high speed storage device 11 is present (step S22). The mapping manager 134a makes this determination based on whether a valid logical address LAa_x (that is, any value other than −1) is set to the j-th entry of the inverse translation table ITT in association with the physical address j.

If the chunk CHKx corresponding to the physical storage area j of the high speed storage device 11 is present (Yes in step S22), the mapping manager 134a proceeds to step S23. The presence of the chunk CHKx corresponding to the physical storage area j means that the logical address LAa_x of the chunk CHKx is mapped to the physical address j of the physical storage area j. In this case, the chunk CHKx is in one of the normal high speed state and the tentative high speed state.

Thus, in step S23, the mapping manager 134a determines whether the chunk CHKx is in the tentative, high speed state (step S23). To make this determination, the mapping manager 134a searches for a first type of mapping information MIa_x including the logical address LAa_x of the chunk CHKx by a process corresponding to steps S1 and S2 in the read process or steps S11 and S12 in the write process. Then, the mapping manager 134a determines that the chunk CHKx is in the tentative high speed state if a mapping information pointer MPb_x included in the first type of mapping information MIa_x is non-NULL.

If the chunk CHKx is in the tentative high speed state as described above (Yes in step S23), the mapping manager 134a proceeds to step S24. In step S24, the mapping manager 134a determines whether a value CNT_x of an access counter CNT_x included in the first type of mapping information MIa_x is smaller than a threshold (second threshold) TH2. The threshold TH2 is smaller than the threshold TH1.

If the counter value CNT_x is smaller than the threshold TH2 (Yes in step S24), the mapping manager 134a determines that even if the current chunk CHKx is in the tentative high speed state, the access condition to the chunk CHKx is the second condition that does not need high speed access. Thus, the mapping manager 134a executes a fourth state change process for changing the chunk CHKx from the tentative high speed state to the low speed state (step S25). The procedure for the fourth state change process will be described later. After executing step S25, the mapping manager 134a proceeds to step S30.

If the counter value CNT_x is not smaller than the threshold TH2 (No in step S24), by contrast, the mapping manager 134a proceeds to step S28. In step S28, the mapping manager 134a determines whether the counter value CNT_x is equal to the threshold TH1 or more (step S28).

If the counter value CNT_x is equal to the threshold TH1 or more (Yes in step S28), the mapping manager 134a determines that the access condition to the chunk CHKx, which is in the tentative high speed state, continues to be the second condition. In this case, the mapping manager 134a executes a third state change process for changing the chunk CHKx from the tentative high speed state to the normal high speed state (step S29). The procedure for the third state change process will be described later. After executing step S29, the mapping manager 134a proceeds to step S30.

In contrast, the counter value CNT_x is assumed to be less than the threshold TH1 (No in step S28). Here, the counter value CNT_x is equal to the threshold TH2 or more (No in step S24). If the counter value CNT_x is equal to the threshold TH2 or more (No in step S24) and less than the threshold TH1 (No in step S28) as described above, the mapping manager 134a determines that the access condition to the chunk CHKx, which is in the tentative high speed state, is a third condition. The third condition indicates a condition in which a determination as to whether the access condition to the chunk CHKx needs high speed access or does not need high speed access should be put on hold. Thus, the mapping manager 134a proceeds to step S30 by skipping step S29 in order to maintain the chunk CHKx in the tentative high speed state.

On the other hand, if the chunk CHKx is not in the tentative high speed state (No in step S23), the mapping manager 134a determines that the chunk CHKx is in the normal high speed state. In this case, like in step S24, the mapping manager 134a determines whether the value CNT_x of the access counter CNT_x included in the first type of mapping information MIa_x is smaller than the threshold TH2 (step S26).

If the counter value CNT_x is smaller than the threshold TH2 (Yes in step S26), the mapping manager 134a determines that even if the chunk CHKx is in the normal high speed state, the access condition to the chunk CHKx is the second condition that does not need high speed access. Thus, the mapping manager 134a executes a second state change process for changing the chunk CHKx from the normal high speed state to the tentative high speed state. The procedure for the second state change process will be described later. After executing step S27, the mapping manager 134a proceeds to step S30.

In contrast, if the counter value CNT_x is not smaller than the threshold TH2 (No in step S26), the mapping manager 134a determines that the access condition to the chunk CHKx, which is in the normal high speed state, continues to be the first condition. In this case, the mapping manager 134a proceeds to step S30 by skipping step S27 in order to maintain the chunk CHKx in the normal high speed state.

In step S30, the mapping manager 134a increments the variable j by 1 (step S30). Next, the mapping manager 134a determines whether the incremented variable j is equal to the maximum value (N−1)+1, that is, N of the physical address of the high speed storage device 11 (step S31).

If the incremented variable j is not equal to N (No in step S31), the mapping manager 134a returns to step S22 for the process of the next physical address (physical storage area) of the high speed storage device 11. In contrast, if the incremented variable j is equal to N (Yes in step S31), the mapping manager 134a determines that all physical addresses (physical storage areas) of the high speed storage device 11 have been processed. In this case, the mapping manager 134a proceeds to step S32 in order to change the chunk CHK_t registered with the transition candidate list CL from the low speed state to the tentative high speed state.

In step S32, in order to refer to the first transition candidate list element CLE in the transition candidate list CL, the mapping manager 134a sets the list pointer LP (see FIG. 8) to a variable p pointing to the target transition candidate list element CLE. The mapping manager 134a determines whether the variable p (here, p=LP) is NULL (step S33). That is, the mapping manager 134a determines whether a valid transition candidate list element CLE pointed to by the variable p is present.

It is assumed here that, as shown in FIG. 8, the variable p (here, p=LP) is not NULL (No in step S33). In this case, the transition candidate list element CLE pointed to by the variable p is present and a first type of mapping information associated with the transition candidate list, element CLE is present. It is assumed that the first type of mapping information is the first type of mapping information MIa_t associated with the chunk CHK_t. That is, a transition candidate registered with the transition candidate list element CLE pointed to by the variable p is assumed to be the chunk CHK_t.

In this case, the mapping manager 134a executes a first state change process for changing the corresponding transition candidate (chunk CHK_t) from the low speed state to the tentative high speed state based on the first type of mapping information MIa_t (step S34). The procedure for the first state change process will be described later.

After executing step S34, the mapping manager 134a proceeds to step S35. At this point, the variable p points to the transition candidate list element CLE used in the first state change process (step S34) executed immediately before. The mapping manager 134a updates the variable p to the next pointer NPc included in the transition candidate list element CLE currently pointed to by the variable p (step S35). The next pointer NPc is denoted by NPc(p). That is, the mapping manager 134a updates the variable p to NPc(p). After executing step S35, the mapping manager 134a returns to step S33.

In this manner, the mapping manager 134a executes the first state change process for changing the corresponding transition candidate (chunk CHK_t) from the low speed state to the tentative high speed state based on the first type of mapping information MIa_t associated with each of all the transition candidate list elements CLE in the transition candidate list CL. That is, the mapping manager 134a executes the first state change process for all transition candidates registered with the transition candidate list CL.

It is assumed here that the first state change process is executed for the last transition candidate (step S34). At this point, the variable p points to the last transition candidate list element CLE in the transition candidate list CL. The mapping manager 134a updates the variable p to the next pointer NPc (that is, NPc(p)) included in the last transition candidate list element CLE (step S35).

The next pointer NPc (p=NPc(p)) included in the last transition candidate list element CLE is NULL (Yes in step S33). In this case, the mapping manager 134a determines that the first state change process has been executed for all transition candidates registered with the transition candidate list CL. Thus, the mapping manager 134a deletes the transition candidate list CL from the work area 132b and finishes the mapping state change process.

Next, details of the first state change process will be described with reference to FIG. 13. FIG. 13 is a flow chart illustrating the exemplary procedure for the first state change process. It is assumed here that the transition candidate to be changed from the low speed state to the tentative high speed state is the chunk CHK_t. The chunk CHK_t is identified based on the first type of mapping information MIa_t associated with the transition candidate list element CLE pointed to by the variable p.

The first type of mapping information MIa_t includes the logical address LAa_t, the physical address PAa_t, the device number DN_t, and the mapping information pointer MPb_t. In this example, the device number DN_t indicates the low speed storage device 12. The mapping information pointer MPb_t is an invalid mapping information pointer (MPb_t=NULL). That is, the chunk CHK_t is in the low speed state and data of the chunk CHK_t is stored only in the low speed storage device 12. In addition, the physical address PAa_t is assumed to be the first physical address.

The mapping manager 134a selects one free physical storage area from a set of free physical storage areas included in the high speed storage device 11 and having the same size as the chunk CHK_t (step S41). That is, the mapping manager 134a acquires one free physical storage area from the high speed storage device 11. The physical address of the acquired physical storage area is assumed to be the second physical address.

Next, the mapping manager 134a copies data (that is, data in the chunk CHK_t) stored in the physical storage area of the low speed storage device 12 specified by the first physical address to the physical storage area (that is, the physical storage area acquired in step S41) of the high speed storage device 11 specified by the second physical address (step S42). Accordingly, data of the chunk CHK_t is present in both of the high speed storage device 11 and the low speed storage device 12.

Next, the mapping manager 134a acquires an area for the bitmap BM_t used to record the position of the block to which data in the chunk CHK_t is written (updated with data in the chunk CHK_t) from the write position information area 132e of the memory 132 (step S43). The mapping manager 134a clears all bits of the acquired area, that is, all bits of the bitmap BM_t to "0" (step S44).

Next, the mapping manager 134a acquires an area for the second type of mapping information MIb_t from the address translation information area 132d of the memory 132 (step S45). Then, the mapping manager 134a sets the bitmap pointer BP_t pointing to the cleared bitmap BM_t to a field F22 of the second type of mapping information MIb_t (step S46). The mapping manager 134a also sets the physical address PAa_t (that is, the first physical address) to the second type of mapping information MIb_t as PAb_t (step S47). The physical address PAa_t (first physical address) is currently set to the first type of mapping information MIa_t in association with the logical address LAa_t of the chunk CHK. That is, the first physical address is set to a field F21 of the second type of mapping information MIb_t.

Next, the mapping manager 134a sets the mapping information pointer MPb_t pointing to the second type of mapping information MIb_t to a field F14 of the first type of mapping information MIa_t (step S48). That is, the mapping manager 134a updates the invalid mapping information pointer MPb_t (MPb_t=NULL) included in the first type of mapping information MIa_t to the valid mapping information pointer MPb_t pointing to the second type of mapping information MIb_t.

Next, the mapping manager 134a sets the second physical address to the first type of mapping information MIa_t as PAa_t (step S49). The second physical address specifies the physical storage area of the high speed storage device 11 to which data of the chunk CHK_t is copied. That is, the second physical address is set to the field F21 of the second type of mapping information MIb_t. Accordingly, the chunk CHK_t makes the transition from the low speed state in which the logical address LAa_t of the chunk CHK_t is mapped to only the first physical address of the low speed storage device 12 to the tentative high speed state in which the logical address LAa_t is mapped to both of the second physical address of the high speed storage device 11 and the first physical address of the low speed storage device 12.

The mapping manager 134a further sets the logical address LAa_t of the chunk CHK_t to an entry of the inverse translation table ITT associated with the second physical address (that is, the second physical address to which data of the chunk CHK_t is copied) (step S50). Accordingly, the first state change process for one transition candidate (chunk CHK_t) is completed.

Here, it is assumed that the storage controller 13 is requested by the host 20 to read data from the chunk CHK_t (that is, the chunk CHK_t after making the transition to the tentative high speed state) or to write data to the chunk CHK_t. In this case, as is evident from the above read process or write process, data is read from the chunk CHK_t or data is written to the chunk CHK_t based on the first type of mapping information MIa_t associated with the chunk CHK_t. That is, the physical storage area specified by the second physical address of the high speed storage device 11 to which the logical address LAa_t of the chunk CHK_t is mapped is accessed. Accordingly, access to the chunk CHK_t in the tentative high speed state is made faster, similar to access to a chunk in the normal high speed state.

Figure 14:
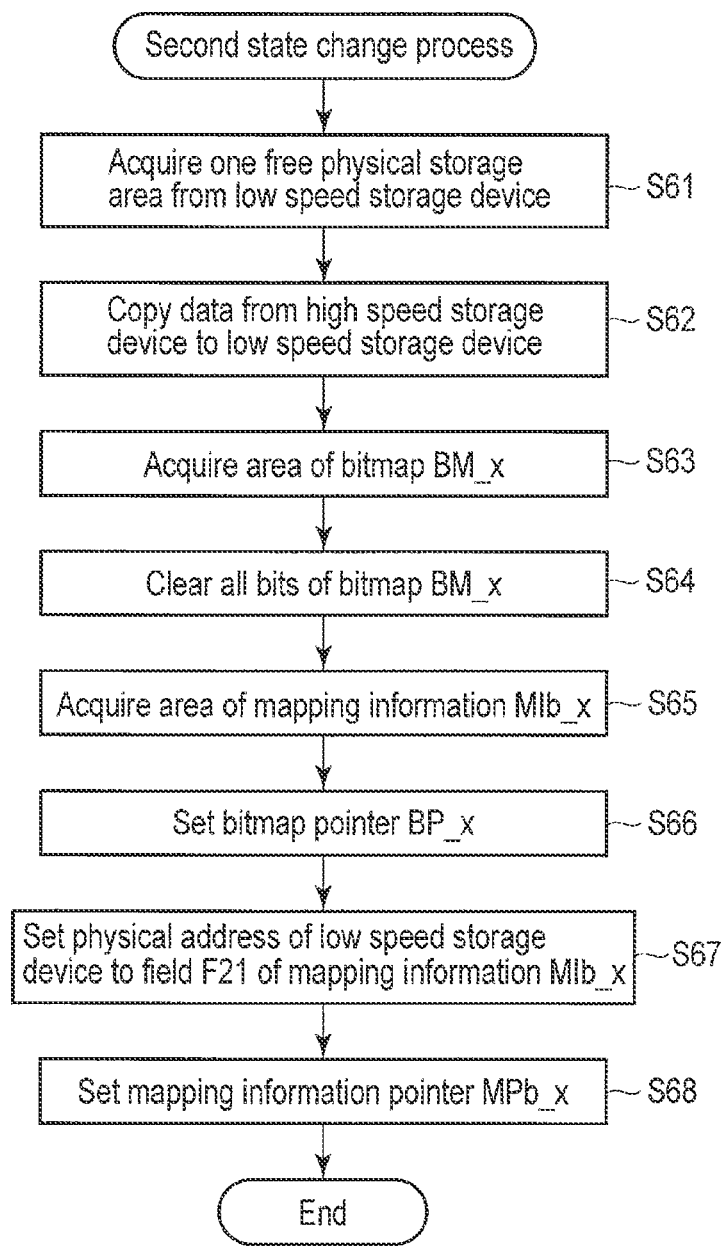
FIG. 14 is a flow chart illustrating the exemplary procedure for a second state change process in the embodiment.

Next, details of the second state change process will be described with reference to FIG. 14. FIG. 14 is a flow chart illustrating the exemplary procedure for the second state change process. It is assumed here that the transition candidate to be changed from the normal high speed state to the tentative high speed state is the chunk CHKx. It is assumed that the first type of mapping information associated with the chunk CHKx is MIa_x and the first type of mapping information MIa_x includes the logical address LAa_x, the physical address PAa_x, the device number DN_x, and the mapping information pointer MPb_x. In this example, the device number DN_x indicates the high speed storage device 11. The mapping information pointer MPb_x is an invalid mapping information pointer (MPb_x=NULL).

The mapping manager 134a selects one free physical storage area from a set of free physical storage areas included in the low speed storage device 12 and having the same size as the chunk CHKx (step S61). That is, the mapping manager 134a acquires one free physical storage area from the low speed storage device 12. The physical address of the acquired physical storage area is assumed to be the physical address PAb_x.

Next, the mapping manager 134a copies data (that is, data in the chunk CHKx) stored in the physical storage area of the high speed storage device 11 specified by the physical address PAa_x to the physical storage area (that is, the physical storage area acquired in step S61) of the low speed storage device 12 specified by the physical address PAb_x (step S62). Accordingly, data of the chunk CHKx is present in both of the high speed storage device 11 and the low speed storage device 12.

Next, the mapping manager 134a acquires an area for the bitmap BM_x used to record the position to which data in the chunk CHKx is written from the write position information area 132e of the memory 132 (step S63). The mapping manager 134a clears all bits of the bitmap BM_t to "0" (step S64).

Next, the mapping manager 134a acquires an area for the second type of mapping information MIb_x from the address translation information area 132d of the memory 132 (step S65). Then, the mapping manager 134a sets the bitmap pointer BP_x pointing to the cleared bitmap BM_x to the field F22 of the second type of mapping information MIb_x (step S66). The mapping manager 134a also sets the physical address PAb_x to the field F21 of the second type of mapping information MIb_x (step S67). The physical address PAb_x specifies the physical storage area of the low speed storage device 12 to which data of the chunk CHKx is copied.

Next, the mapping manager 134a sets the mapping information pointer MPb_x pointing to the second type of mapping information MIb_x to the field F14 of the first type of mapping information MIa_x (step S68). That is, the mapping manager 134a updates the invalid mapping information pointer MPb_x (MPb_x=NULL) included in the first type of mapping information. MIa_x to the valid mapping information pointer MPb_x pointing to the second type of mapping information MIb_x. This completes the second state change process for the chunk CHKx.

Next, details of the third state change process will be described with reference to FIG. 15. FIG. 15 is a flow chart illustrating the exemplary procedure for the third state change process. It is assumed here that the transition candidate to be changed from the tentative high speed state to the normal high speed state is the chunk CHKx. It is assumed that the first type of mapping information associated with the chunk CHKx is MIa_x and the first type of mapping information MIa_x includes the logical address LAa_x, the physical address PAa_x, the device number DN_x, and the mapping information pointer MPb_x. In this example, the device number DN_x indicates the high speed storage device 11. The mapping information pointer MPb_x is non-NULL (valid) and points to the second type of mapping information MIb_x.

First, the mapping manager 134a releases the physical storage area of the low speed storage device 12 specified by the physical address PAb_x set to the second type of mapping information MIb_x (step S71). Next, the mapping manager 134a releases the area of the bitmap BM_x pointed to by the bitmap pointer BP_x set to the second type of mapping information MIb_x (step S72).

The mapping manager 134a also releases the area of the second type of mapping information MIb_x (step S73). Next, the mapping manager 134a updates the valid mapping information pointer MPb_x included in the first type of mapping information MIa_x to NULL (invalid mapping information pointer MPb_x) (step S74). That is, the mapping manager 134a sets NULL to the field F14 of the first type of mapping information MIa_x. This completes the third state change process for the chunk CHKx.

Next, details of the fourth state change process will be described with reference to FIG. 16. FIG. 16 is a flow chart illustrating the exemplary procedure for the fourth state change process. It is assumed here that the transition candidate to be changed from the tentative high speed state to the low speed state is the chunk CHKx. It is assumed that the first type of mapping information associated with the chunk CHKx is MIa_x and the first type of mapping information MIa_x includes the logical, address LAa_x, the physical address PAa_x, the device number DN_x, and the mapping information pointer MPb_x. In this example, the device number DN_x indicates the high speed storage device 11. The mapping information pointer MPb_x is non-NULL (valid) and points to the second type of mapping information MIb_x. The second type of mapping information MIb_x includes the physical address PAb_x and the bitmap pointer BP_x. The bitmap pointer BP_x points to the bitmap BM_x.

First, the mapping manager 134a refers to the bitmap BM_x pointed to by the bitmap pointer BP_x and searches for all bits to which "1" is set (step S81). In step S81, the mapping manager 134a identifies all blocks included in the physical storage area of the high speed storage device 11 specified by the physical address PAa_x and corresponding to searched bits. In step S81, the mapping manager 134a copies (reflects) data of all identified blocks (first blocks) to corresponding blocks (second blocks) in the physical storage area of the low speed storage device 12 specified by the physical address PAb_x. Accordingly, data in the physical storage area of the low speed storage device 12 specified by the physical address PAb_x matches data in the physical storage area of the high speed storage device 11 specified by the physical address PAa_x.

Next, the mapping manager 134a sets the current physical address PAb_x (that is, the physical address PAb_x currently set to the second type of mapping information MIb_x) to the field F12 of the first type of mapping information MIa_x as PAa_x (step S82). Next, the mapping manager 134a releases the area of the bitmap BM_x (step S83) and also releases the area of the second type of mapping information MIb_x (step S84).

Next, the mapping manager 134a updates the valid mapping information pointer MPb_x included in the first type of mapping information MIa_x to NULL (invalid mapping information pointer MPb_x) (step S85). That is, the mapping manager 134a sets NULL to the field F14 of the first type of mapping information MIa_x. Then, the mapping manager 134a sets the invalid value (−1) to the entry of the inverse translation table ITT associated with the physical address PAa_x (step S86). This completes the fourth state change process for the chunk CHKx.

The above operations and effects in the embodiment will be summarized below. For example, it is assumed that the value of the first access counter corresponding to the first chunk reaches the threshold TH1 in the first monitoring period (Yes in step S5 or S17). That is, it is assumed that the number of times (frequency) of access to the first chunk in the first monitoring period is equal to the threshold TH1 or more and the first chunk is in the access condition that needs high speed access. Moreover, the first chunk is assumed to be in the low speed state (second state) when the first monitoring period starts (Yes in step S6 or S18).

In this case, according to conventional technology, the first chunk is changed from the slow speed state to the high speed state (corresponding to the normal high speed state in the embodiment) before the start of the second monitoring period succeeding the first monitoring period. Here, data in the first chunk is copied from the low speed storage device 12 to the high speed storage device 11. At this point, data in the low speed storage device 12 is discarded (nullified). That is, the data in the first chunk is migrated from the low speed storage device 12 to the high speed storage device 11.

It is assumed here that the access condition to the first chunk is the second condition that normally does not need high speed access and changes to the first condition that needs high speed access only in the first monitoring period. In this case, according to conventional technology, the first chunk normally in the low speed state is changed from the low speed state to the high speed state only after the first monitoring period and changed again to the low speed state after the next second monitoring period.

When the state transition of the first chunk takes place as described above, access to the low speed storage device 12 needed to migrate data accompanying the state transition arises during transition from the low speed state to the high speed state and during transition from the high speed state to the low speed state. Thus, an increase in access to the low speed storage device 12 due to data migration accompanying temporary changes of the mapping state leads to lower efficiency of the mapping state change process executed each time the monitoring time passes. Such lower efficiency of the mapping state change process also arises when the number of times of access to the first chunk fluctuates between a value near the threshold TH1 and a value near the threshold TH2. That is, lower efficiency of the mapping state change process also arises when the vibration of mapping state transition arises. To prevent the vibration, as applied in the embodiment, using the two thresholds TH1 and TH2 (TH2<TH1) can be considered. The threshold TH1 is a first judgment condition used to determine whether to change the mapping state to the high speed state. The threshold TH2 is a second judgment condition used to determine whether to change the mapping state to the low speed state. However, it is difficult to sufficiently prevent, the vibration of state transition by simply applying the two thresholds TH1 and TH2 if, for example, the difference between the thresholds TH1 and TH2 is small. Conversely, if the difference between the thresholds TH1 and TH2 is large, the possibility that, the mapping state of a chunk whose mapping state should be changed is not changed increases.

According to the embodiment, by contrast, if the mapping state of the first chunk is determined to be changed to, for example, the high speed state based on the number of times of access an the first monitoring period, the first chunk is changed from the low speed state to the tentative high speed state after the first monitoring period (step S34). Here, data in the first chunk is copied from the low speed storage device 12 to the high speed storage device 11. At this point, the second type of mapping information is set based on the first type of mapping information (old mapping information) in order to maintain the state in which the first chunk is mapped to the first physical storage area of the low speed storage device 12. In addition, a free second physical storage area is acquired from the high speed storage device 11 in order to map the first chunk also to the high speed storage device 11. Then, the first type of mapping information is updated from the state in which the first chunk is mapped to the first physical storage area to the state in which the first chunk is mapped to the second physical storage area. Accordingly, data in the first chunk is present in both of the high speed storage device 11 and the low speed storage device 12.

Thus, in the embodiment, if no request to write into the first chunk is made in the second monitoring period in which the first chunk is in the tentative high speed state, even if the tentative high speed state is changed to the low speed state after the second monitoring period, no access to the low speed storage device 12 accompanying the state transition arises. Therefore, according to the embodiment, when compared with a case of the transition of the first chunk, i.e., "low speed state->high speed state->low speed state" according to the conventional technology, the number of times of access to the low speed storage device 12 can be reduced by one time when the first chunk makes the transition like "low speed state->tentative high speed state->low speed state". That is, according to the embodiment, a decrease in efficiency of the mapping state change process executed each time the monitoring time passes can be prevented to reduce the influence of the state change process on the operation of the storage system 10.

The mapping state change process is generally executed in a time zone (for example, a time zone when the number of times of access to the storage system 10 is small) that has less influence on the original operation (ordinary operation) of the storage system 10. Thus, the storage controller 13 of the storage system 10 is required to execute the mapping state change process in a short time. The above effect of the embodiment can meet such a requirement. The effect will be particularly pronounced when the mapping state change process is executed frequently.

In the embodiment, as described above, if the first chunk is in the tentative high speed state when access to the first chunk is requested, actual access occurs to the second physical storage area of the high speed storage device 11. Thus, if a request to write into the first chunk is made in a period in which the first chunk is in the tentative high speed state, actual data is written into only the second physical storage area of the high speed storage device 11. Accordingly, data in the first physical storage area of the low speed storage device 12 and data in the second physical storage area of the high speed storage device 11 do not match.

Thus, also in the embodiment, if data is written into the first chunk in a monitoring period in which the first chunk is in the tentative high speed state and the first chunk is changed from the tentative high speed state to the low speed state after the monitoring period passes (step S25), access to the low speed storage device 12 occurs. In this access, however, only data (update data) of a block where a write (update) occurred in the second physical storage area of the high speed storage device 11 is reflected (written) in the corresponding block of the first physical storage area of the low speed storage device 12. After the update data is reflected, the first type of mapping information is updated from the state in which the first chunk is mapped into the second physical storage area to the state in which the first chunk is mapped into the first physical storage area and data in the second physical storage area is discarded (nullified).

In a condition in which the first chunk is changed from the tentative high speed state to the low speed state after a monitoring period passes, the number of times of access to the first chunk is small in the monitoring period and is less than the threshold TH2. In this case, the number of blocks to be written into the second physical storage area in the monitoring period is also expected to be small. Thus, even if a data write into the first physical storage area occurs in order to bring the first chunk back to the low speed state after the transition to the tentative high speed state, the amount of the data is significantly reduced. Therefore, when compared with a case in which data of all blocks (here, 8,192 blocks) in the second physical storage area is reflected (written) in the first physical storage area, the time needed to write data into the first physical storage area accompanying the change from the tentative high speed state to the low speed state is short. Therefore, according to the embodiment, when the number of times of access to the first chunk temporarily changed from the low speed state to the tentative high speed state decreases in the next monitoring period, the first chunk can be brought back to the low speed state in a short time. Accordingly, the presence of the first chunk, even, if in the tentative high speed state, whose number of times of access decreases can be prevented from adversely affecting the overall efficiency of the storage system 10.

Also in the embodiment, the position of a block of the second physical storage area into which data is written is managed by using the bitmap BM. The bitmap BM is stored in the write position information area 132e of the memory 132 that is faster than the high speed storage device 11. In the embodiment, when a write into the first chunk is requested, actual data is written into the second physical storage area at high speed if the first chunk is in the tentative high speed state. At this point, 1 is set to the corresponding bit of the bitmap BM in order to record the position of the block in the second physical storage area into which actual data is written. However, the bit operation is performed on the memory 132. Thus, the performance when data is written into the first chunk in the tentative high speed state is hardly different from the performance when data is written into a chunk in the normal high speed state.

When the bitmap BM is stored in the memory 132, write position information indicated by the bitmap BM may be lost due to, for example, a sudden power failure of the storage system 10. However, actual data itself remains in the high speed storage device 11 (second physical storage area). Therefore, if write position information is lost, data in the entire second physical storage area may be copied to the low speed storage device 12 (first physical storage area).

The storage system 10 applied in the embodiment is assumed to function as a block device accessed in units of blocks. However, the storage system 10 may be accessed in units of files. In such a case, there is not necessarily a need to use a bitmap for the storage controller 137 to record the position in the physical storage area of the high speed storage device 11 to which actual data is written. For example, the storage controller 13 may use write position information in which a set of an offset address showing and the data is successively recorded. The offset address shows the position in the physical storage area where data is written.

In the embodiment, if the number of times of access to the first chunk changed, as described above, from the low speed state to the tentative high speed state is equal to the threshold TH1 or more also in the second monitoring period (Yes in step S28), the first chunk is changed from the tentative high speed state to the normal high speed state (step S29). Only the state in which the first chunk is mapped to the first physical storage area needs to be released (nullified) to make the change and there is no need to copy (migrate) data. Therefore, according to the embodiment, the change from the tentative high speed state to the normal high speed state can be made in a short time. Here, data remaining in the low speed storage device 12 (first physical storage area) and the write position information are nullified.

Next, it is assumed that the first chunk is in the normal high speed state in the third monitoring period (No in step S23) and the number of time of access to the first chunk in the third monitoring period is less than the threshold TH2 (Yes in step S26). In this case, according to the conventional technology, the first chunk is changed from the high speed state to the low speed state after the third monitoring period. Here, data in the first chunk is copied from the high speed storage device 11 to the low speed storage device 12. At this point, data in the high speed storage device 11 is discarded. That is, data in the first chunk is migrated from the high speed storage device 11 to the low speed storage device 12.

It is assumed here that the number of times of access to the first chunk in the fourth monitoring period succeeding the third monitoring period is equal to the threshold TH1 or more. In this case, according to the conventional technology, the first chunk is changed from the low speed state to the high speed state again after the fourth monitoring period. At this point, data in the low speed storage device 12 is migrated to the high speed storage device 11.

In the embodiment, by contrast, the first chunk is changed from the high speed state (normal high speed state) to the tentative high speed state after the third monitoring period (step S27). Here, a free first physical storage area is acquired from the low speed storage device 12. Then, data in the first chunk is copied from the high speed storage device 11 (second physical storage area) to the low speed storage device 12 (first physical storage area). At this point, the second type of mapping information is set so that the first chunk is also mapped to the first physical storage area of the low speed storage device 12. Moreover, in the embodiment, the state in which the first chunk is mapped to the second physical storage area of the high speed storage device 11 is maintained. That is, data in the first chunk is present in both of the high speed storage device 11 and the low speed storage device 12.

Thus, according to the embodiment, if the number of times of access to the first chunk in the fourth monitoring period becomes equal to the threshold TH1 or more (Yes in step S28), there is no need to read data from the low speed storage device 12 and the first chunk can be brought from the tentative high speed state back to the normal high speed state.

Therefore, according to the embodiment, the process time of mapping of a chunk in which unexpected changes of the number of times of access or the vibration of changes of the mapping state occurs can be reduced more than in the past by using the tentative high speed state positioned between the low speed state and the high speed state as the state of each chunk. Also according to the embodiment, a chunk expected to have an increasing number of times of access, though in the low speed state, is temporarily changed to the tentative high speed state in a short time and if the number of times of access is still expected to be large also in the tentative high speed state, the chunk is changed to the high speed state (normal high speed state) in a short time. A chunk in the tentative high speed state can be accessed at high speed like a chunk in the normal high speed state. In addition, even if a chunk in the tentative high speed state should be changed to the low speed state after the access condition to the chunk in the tentative high speed state changes, the chunk can be changed to the low speed state in a short time. Therefore, the method of the state transition applied in the embodiment is superior to the method of simply postponing the shift from the low speed state to the high speed state in order to prevent the vibration of the state transition.

Similarly, according to the embodiment, a chunk expected to have a small number of times of access, though in the high speed state (normal high speed state), is temporarily changed to the tentative high speed state in a short time and if the number of time of access is still expected to be small also in the tentative high speed state, the chunk is changed to the low speed state in a short time. In addition, even if a chunk in the tentative high speed state should be changed to the normal high speed state after the access condition to the chunk in the tentative high speed state changes, the chunk can be changed to the normal high speed state in a short time. Therefore, the method of the state transition applied in the embodiment is superior to the method of simply postponing the shift from the high speed state to the low speed state to prevent the vibration of the state transition.

In the above embodiment, chunks registered with the transition candidate list CL are all changed from the low speed state to the tentative high speed state as long as a free physical storage area is present in the high speed storage device 11. However, as will be described below, all chunks registered with the transition candidate list CL do not necessarily need to be changed to the tentative high speed state. Here, a group of chunks registered with the transition candidate list CL (that is, a group of candidates to be changed from the low speed state to the tentative high speed state) is called a first group of candidates. A group of chunks in the normal high speed state whose number of times of access falls short of the threshold TH2 (that is, a group of candidates to be changed from the normal high speed state to the tentative high speed state) is called a second group of candidates. In addition, a group of candidates in the tentative high speed state is called a third group of candidates.

The mapping manager 134a ranks the first group of candidates in descending order of number of times (or total sum of data amounts) of access to the first group of candidates. The mapping manager 134a also ranks the second group of candidates in ascending order of number of times (or total sum of data amounts) of access to the second group of candidates. Further, the mapping manager 134a also ranks the third group of candidates in descending order and ascending order of number of times (or total sum of data amounts) of access to the third group of candidates. In this case, a group of candidates ranked in descending order of number of times (or total sum of data amounts) of access shows the order of candidates to be changed from the tentative high speed state to the normal high speed state. In contrast, a group of candidates ranked in ascending order of number of times (or total sum of data amounts) of access shows the order of candidates to be changed from the tentative high speed state to the low speed state.

Based on the above ranking result, the mapping manager 134a decides the transition destination of the mapping state in order of decreasing ranking of the respective groups of candidates in such a way that the sum of the number of chunks in the normal high speed state and the number of chunks in the tentative high speed state is a predetermined number or a number in a predetermined range. That is, the mapping manager 134a decides whether to make the transition to the normal high speed state, the tentative high speed state, or the low speed state or to maintain the current state for each candidate in order of decreasing ranking respective groups of candidates. Accordingly, the number of chunks mapped to physical storage areas of the high speed storage device 11 having a smaller capacity than the low speed storage device 12 can be made to match the predetermined number or the predetermined range.

Also in the above embodiment, the thresholds TH1 and TH2 are fixed to predetermined values. However, if a number CN1 of candidates (chunks) to be changed to the high speed side and a number CN2 of candidates (chunks) to be changed to the low speed side are biased in the mapping state change process, the thresholds TH1 and TH2 may be changed in the subsequent mapping state change processes. If, for example, the absolute value of the difference of CN1 and CN2 exceeds a predetermined value α, the thresholds TH1 and TH2 may be chanced. For example, the maximum value and the minimum value of the number of times of access of all chunks in the tentative high speed state after the first monitoring period may be set as the new thresholds TH1 and TH2 in the subsequent second monitoring period, respectively.

Also in the above embodiment, the two thresholds TH1 and TH2 are used for judgments to change the mapping state. However, only one threshold TH may be used for judgments to change the mapping state. In this case, the mapping manager changes a chunk in the low speed state to the tentative high speed state when the number of times (or the total sum of data amounts) of access to the chunk exceeds the threshold TH and changes a chunk in the tentative high speed state to the normal high speed state when the number of times (or the total sum of data amounts) of access to the chunk exceeds the threshold TH. Also, the mapping manager 134a changes a chunk in the normal high speed state to the tentative high speed state when the number of times (or the total sum of data amounts) of access to the chunk falls short of the threshold TH and changes a chunk in the tentative high speed state to the low speed state when the number of times (or the total sum of data amounts) of access to the chunk falls short of the threshold TH.

In addition to the thresholds TH1 and TH2, thresholds TH3 and TH4 may be used for judgments to change the mapping state. The threshold TH3 is larger than the threshold TH1 and the threshold TH4 is smaller than the threshold. TH2. That is, among the thresholds TH1, TH2, TH3 and TH4, there is the following relationship of $TH4<TH2<TH1<TH3.$ In this case, the mapping manager 134a determines that the access condition to a chunk in the low speed state is the first condition that needs high speed access if the number of times (or the total sum of data amounts) of access to the chunk exceeds the threshold TH1. Then, the mapping manager 134a changes the chunk to the tentative high speed state. Also, the mapping manager 134a determines that the first condition continues after the change to the tentative high speed state if the number of times (or the total sum of data amounts) of access to the chunk in the tentative high speed state exceeds the threshold TH3. Then, the mapping manager 134a changes the chunk to the normal high speed state.

The mapping manager 134a determines that the access condition to a chunk in the normal high speed state is the second condition that does not need high speed access if the number of times (or the total sum of data amounts) of access to the chunk falls short of the threshold TH2. Then, the mapping manager 134a changes the chunk to the tentative high speed state. Also, the mapping manager 134a determines that the second condition continues after the change to the tentative high speed state if the number of times (or the total sum of data amounts) of access to the chunk in the tentative high speed state falls short of the threshold TH4. Then, the mapping manager 134a changes the chunk to the low speed state.

According to at least one embodiment described above, a storage system, a storage controller, and a method capable of reducing the process time needed to change the mapping state between a logical address and a physical address can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
a first storage device;
a second storage device configured to be slower and include a larger capacity than the first storage device; and
a storage controller configured to control access to the first storage device and access to the second storage device, wherein the storage controller comprises
a mapping manager configured to manage to which of a first state, a second state, and a third state each chunk of a first size in a logical unit is set, the first state being a state in which a logical address of the chunk is mapped to a physical address of a physical storage area in the first storage device by a first type of mapping information, the second state being a state in which the logical address is mapped to a physical address of a physical storage area in the second storage device by the first type of mapping information, and the third state being a state in which the logical address is mapped to the physical address of the physical storage area in the first storage device by the first type of mapping information and also napped to the physical address of the physical storage area in the second storage device by a second type of mapping information;

an address translation unit configured to translate the logical address specified by a read request or a write request from a host apparatus into the physical address of the physical storage area in the first storage device or the second storage device mapped by the first type of mapping information; and an access controller configured to access the first storage device or the second storage device based on the translated physical address, and wherein the mapping manager is configured to:

monitor an access condition to the chunk for each of the chunks in the logical unit;

change a first chunk from the second state to the third state if the access condition to the first chunk is a first condition that needs high speed access and the first chunk is in the second state;

change the first chunk from the third state to the first state if the first condition continues after the first chunk is changed from the second state to the third state; and change the first chunk from the third state to the second state if the access condition to the first chunk changes to a second condition that does not need the high speed access after the first chunk is changed from the second state to the third state.

2. The storage system of claim 1, wherein changing from the second state to the third state comprises copying data in a first physical storage area in the second storage device to a newly acquired second physical storage area in the first storage device, the first physical storage area being specified by a first physical address and the first physical address being mapped to a first logical address of the first chunk by the first type of first mapping information corresponding to the first chunk;

replacing the first physical address set to the first mapping information by a second physical address of the second physical storage area; and setting the first physical address to the second type of second mapping information corresponding to the first chunk.

3. The storage system of claim 2, wherein the access controller is configured to write actual data into the second physical storage area of the first physical storage area and the second physical storage area when the first chunk is in the third state and a data write into the first chunk is specified by a first write request.

4. The storage system of claim 3, wherein the mapping manager is configured to:

manage a write position where data is changed by write access for each of the chunks in the third state based on write position information; and add information indicating the white position where data is changed to first write position information associated with the first chunk when the first chunk is in the third state and the actual data is written into the second physical storage area in accordance with the specification of the data write to the first chunk, and wherein changing from the third state to the second state comprises reflecting the data changed in the second physical storage area in the first physical storage area the second physical storage area being indicated by the first write position information;

replacing the second physical address set to the first mapping information by the first physical address set to the second map information;

nullifying the second map ing information; and releasing a first storage area for the first write position information and the second physical storage area.

5. The storage system of claim 4, wherein changing from the third state to the first state comprises nullifying the second mapping information; and releasing the first storage area and the first physical storage area.

6. The storage system of claim 4, wherein the storage controller further comprises a memory including a storage area in which the write position information is stored and faster than the first storage device.

7. The storage system of claim 1, wherein the mapping manager is configured to:

change the first chunk from the first state to the third state if the access condition to the first chunk is the second condition and the first chunk is in the first state;

change the first chunk from the third state to the second state if the second condition continues after the first chunk is changed from the first state to the third state; and change the first chunk from the gird state to the first state if the access condition to the first chunk changes to the first condition after the first chunk is changed from the first state to the third state.

8. The storage system of claim 7, wherein changing from the first state to the third state comprises copying data in a second physical storage area in the first storage device to a newly acquired first physical storage area in the second storage device, the second physical storage area being specified by a second physical address and the second physical address being mapped to a first logical address of the first chunk by the first type of first mapping information corresponding to the first chunk; and setting a first physical address of the first physical storage area to the second type of second mapping information corresponding to the first chunk.

9. The storage system of claim 7, further comprising an access counter configured to count a number of times or a total sum of data amounts of access to the chunk occurring in a monitoring period for each of the chunks, wherein the mapping manager is configured to determine, in units of the monitoring periods, the access condition to the chunk based on a value of the access counter corresponding to each of the chunks.

10. The storage system of claim 9, wherein the mapping manager is configured to:

determine that the access condition to the first chunk is the first condition if a value of a first access counter corresponding to the first chunk is larger than a threshold; and determine that the first chunk is in the second condition if the value of the first access counter is smaller than the threshold.

11. The storage system of claim 9, wherein the mapping manager is configured to:

determine that the access condition to the first chunk is the first condition if a value of a first access counter corresponding to the first chunk is larger than a first threshold; and determine that the access condition to the first chunk is the second condition if the value of the first access counter is smaller than a second threshold smaller than the first threshold.

12. The storage system of claim 11, wherein the mapping manager is configured to:
   determine that the access condition to the first chunk is a third condition if the value of the first access counter is between the first threshold and the second threshold; and
   maintain the first chunk in the third state if the access condition to the first chunk is the third condition and the first chunk is in the third state.

13. The storage system of claim 9, wherein the mapping manager is configured to:
   determine that the access condition to the first chunk is the first condition if a value of a first access counter corresponding to the first chunk is larger than a first threshold;
   determine that the access condition to the first chunk is the second condition if the value of the first access counter is smaller than a second threshold smaller than the first threshold;
   determine that the first condition continues if a second value of the first access counter in a second monitoring period succeeding a first monitoring period is larger than a third threshold larger than the first threshold after the mapping manager changes the first chunk to the third state based on a first value of the first access counter in the first monitoring period; and
   determine that the second condition continues if a fourth value of the first access counter in a fourth monitoring period succeeding a third monitoring period is smaller than a fourth threshold smaller than the second threshold after changing the first chunk to the third state based on a third value of the first access counter in the third monitoring period.

14. The storage system of claim 13, wherein the mapping manager is configured to:
   determine that the access condition to the first chunk is the third condition if the value of the first access counter is between the third threshold and the fourth threshold; and
   maintain the first chunk in the third state if the access condition to the first chunk is the third condition and the first chunk is in the third state.

15. A storage controller configured to control access to a first storage device and access to a second storage device configured to be slower and include a larger capacity than the first storage device, the storage controller comprising:
   a mapping manager configured to manage to which of a first state, a second state, and a third state each chunk of a first size in a logical unit is set, the first state being a state in which a logical address of the chunk is mapped to a physical address of a physical storage area in the first storage device by a first type of mapping information, the second state being a state in which the logical address is mapped to a physical address of a physical storage area in the second storage device by the first type of mapping information, and the third state being a state in which the logical address is mapped to the physical address of the physical storage area in the first storage device by the first type of mapping information and also mapped to the physical address of the physical storage area in the second storage device by a second type of mapping information;
   an address translation unit configured to translate the logical address specified by a read request or a write request from a host apparatus into the physical address of the physical storage area in the first storage device or the second storage device mapped by the first type of mapping information; and
   an access controller configured to access the first storage device or the second storage device based on the translated physical address,
   wherein the mapping manager is configured to:
      monitor an access condition to the chunk for each of the chunks in the logical unit;
      change a first chunk from the second state to the third state if the access condition to the first chunk is a first condition that needs high speed access and the first chunk is in the second state;
      chance the first chunk from the third state to the first state if the first condition continues after the first chunk is changed from the second state to the third state; and
      change the first chunk from the third state to the second state if the access condition to the first chunk changes to a second condition that does not need the high speed access after the first chunk is changed from the second state to the third state.

16. The storage controller of claim 15, wherein changing from the second state to the third state comprises
   copying data in a first physical storage area in the second storage device to a newly acquired second physical storage area in the first storage device, the first physical storage area being specified by a first physical address and the first physical address being mapped to a first logical address of the first chunk by the first type of first mapping information corresponding to the first chunk;
   replacing the first physical address set to the first mapping information by a second physical address of the second physical storage area; and
   setting the first physical address to the second type of second mapping information corresponding to the first chunk.

17. The storage controller of claim 15, wherein the mapping manager is configured to:
   change the first chunk from the first state to the third state if the access condition to the first chunk is the second condition and the first chunk is in the first state;
   change the first chunk from the third state to the second state if the second condition continues after the first chunk is changed from the first state to the third state; and
   change the first chunk from the third state to the first state if the access condition to the first chunk changes to the first condition after the first chunk is changed from the first state to the third state.

18. A method, implemented in a storage controller, for managing mapping between a logical address and a physical address, the storage controller being configured to control access to a first storage device and access to a second storage device configured to be slower and include a larger capacity than the first storage device, the method comprising:
   monitoring, for each chunk of a first size in a logical unit, an access condition to the chunk;
   changing a first chunk from a second state to a third state if the access condition to the first chunk is a first condition that needs high speed access and the first chunk is in the second state of a first state, the second state, and the third state; the first state being a state in which a first logical address of the first chunk is mapped to a second physical address of a second physical storage area in the first storage device by a first type of first mapping information, the second state being a state in which the first logical address is mapped to a first physical address of a first physical storage area in the second storage device by the first mapping information, and the third state being a state in which the first logical address is mapped to the second physical address by the first mapping information and also mapped to the first physical address by a second type of second mapping information;

changing the first chunk from the third state to the first state if the first condition continues after the first chunk is changed from the second state to the third state;

changing the first chunk from the third state to the second state if the access condition to the first chunk changes to a second condition that does not need the high speed access after the first chunk is changed from the second state to the third state;

translating the logical address specified by a read request or a write request from a host apparatus into the physical address of a physical storage area in the first storage device or the second storage device mapped by the first type of mapping information; and accessing the first storage device or the second storage device based on the translated physical address.

19. The method of claim 18, wherein changing from the second state to the third state comprises copying data in the first physical storage area in the second storage device to the second physical storage area in the first storage device which is newly acquired, the first physical storage area being specified by the first physical address and the first physical address being mapped to the first logical address of the first chunk by the first type of first mapping information corresponding to the first chunk;

replacing the first physical address set to the first mapping information by the second physical address of the second physical storage area; and setting the first physical address to the second type of second mapping information corresponding to the first chunk.

20. The method of claim 18, further comprising:

changing the first chunk from the first state to the third state if the access condition to the first chunk is the second condition and the first chunk is in the first state;

changing the first chunk from the third state to the second state if the second condition continues after the first chunk is changed from the first state to the third state; and changing the first chunk from the third state to the first state if the access condition to the first chunk changes to the first condition after the first chunk is changed from the first state to the third state.

* * * * *

UNITED STATES PATENT AND TRADEMARK OFFICE
CERTIFICATE OF CORRECTION

PATENT NO. : 9,063,877 B2
APPLICATION NO. : 13/955999
DATED : June 23, 2015
INVENTOR(S) : Nakase Page 1 of 1

It is certified that error appears in the above-identified patent and that said Letters Patent is hereby corrected as shown below:

In the claims

Claim 1, column 29, line 2, change "and also napped to" to --and also mapped to--.

Claim 4, column 30, line 3, change "the second map information" to --the second mapping information--.

Claim 4, column 30, line 4, change "the second map ing information" to --the second mapping information--.

Claim 7, column 30, line 25, change "from the gird state" to --from the third state--.

Claim 15, column 32, line 11, change "chance the first chunk" to --change the first chunk--.

Signed and Sealed this
First Day of December, 2015

Michelle K. Lee
*Director of the United States Patent and Trademark Office*